US009387557B2

(12) United States Patent
Doo et al.

(10) Patent No.: US 9,387,557 B2
(45) Date of Patent: Jul. 12, 2016

(54) RIVETING METHOD AND APPARATUS

(75) Inventors: Roger Stanton Doo, Flintshire (GB);
Wojciech Gostylla, Queensland (AU);
Neal Sean Williams, Queensland (AU);
Christopher James Clarke, Cheshire (GB); Russell John Trinick, Flintshire (GB); Stuart Edmund Blacket, Queensland (AU)

(73) Assignee: Henrob Limited, Flintshire (GB)

( * ) Notice: Subject to any disclaimer, the term of this patent is extended or adjusted under 35 U.S.C. 154(b) by 303 days.

(21) Appl. No.: 13/880,246

(22) PCT Filed: Nov. 10, 2011

(86) PCT No.: PCT/GB2011/001584
§ 371 (c)(1),
(2), (4) Date: Apr. 18, 2013

(87) PCT Pub. No.: WO2012/063022
PCT Pub. Date: May 18, 2012

(65) Prior Publication Data
US 2013/0205574 A1 Aug. 15, 2013

(30) Foreign Application Priority Data

Nov. 10, 2010 (GB) .................................. 1018995.9
Nov. 16, 2010 (GB) .................................. 1019410.8

(51) Int. Cl.
*B21J 15/02* (2006.01)
*B21J 15/10* (2006.01)
(Continued)

(52) U.S. Cl.
CPC ................. *B23P 19/02* (2013.01); *B21J 15/02* (2013.01); *B21J 15/025* (2013.01); *B21J 15/10* (2013.01);
(Continued)

(58) Field of Classification Search
CPC ................... Y10T 29/49835; Y10T 29/49954;
Y10T 29/49943; Y10T 29/5343; Y10T 29/5377; B21J 15/025; B21J 15/285; B21J 15/28; B21J 15/02; B21J 15/10; B21J 15/32; B21D 39/034; B23P 19/062
See application file for complete search history.

(56) References Cited
U.S. PATENT DOCUMENTS 2,244,048 A  6/1941  Butter
3,072,279 A  1/1963  Ikelheimer
(Continued)

FOREIGN PATENT DOCUMENTS

CN  1113837  12/1995
DE  2225966  12/1973
(Continued)

OTHER PUBLICATIONS

PCT/GB2011/001584 International Search Report and Written Opinion date mailed Jul. 5, 2012 (10 pages).
(Continued)

*Primary Examiner* — Jermie Cozart
(74) *Attorney, Agent, or Firm* — Michael Best & Friedrich LLP

(57) ABSTRACT

A method of riveting comprising using a punch to push a rivet through a workpiece such that a shank of the rivet is received in a die defined by a die body which is in contact with the workpiece, a slug of material being removed from the workpiece by the rivet and being received in the die, the method further comprising closing or substantially closing the die using a rod and using the rod to upset the shank of the rivet.

37 Claims, 15 Drawing Sheets

(51) Int. Cl.
  *B23P 19/02* (2006.01)
  *B21J 15/28* (2006.01)
  *B21J 15/36* (2006.01)

(52) U.S. Cl.
  CPC ...... *B21J 15/28* (2013.01); *B21J 15/36* (2013.01); *Y10T 29/49943* (2015.01); *Y10T 29/49947* (2015.01); *Y10T 29/49956* (2015.01); *Y10T 29/5148* (2015.01); *Y10T 29/53* (2015.01); *Y10T 29/5343* (2015.01); *Y10T 29/5377* (2015.01); *Y10T 29/53539* (2015.01); *Y10T 29/53774* (2015.01)

(56) References Cited

U.S. PATENT DOCUMENTS

| | | | |
|---|---|---|---|
| 3,250,451 | A | 5/1966 | Fulop |
| 3,432,925 | A * | 3/1969 | Woolley .................. 29/882 |
| 3,630,116 | A | 12/1971 | Harper |
| 3,948,427 | A | 4/1976 | Claydon et al. |
| 4,099,324 | A | 7/1978 | Johnson et al. |
| 4,201,325 | A | 5/1980 | Jochum |
| 4,459,735 | A | 7/1984 | Sawdon |
| 4,615,475 | A | 10/1986 | Fuhrmeister |
| 4,757,609 | A | 7/1988 | Sawdon |
| 4,760,633 | A | 8/1988 | Dacey |
| 4,819,856 | A | 4/1989 | Davern et al. |
| 4,884,431 | A | 12/1989 | Dacey |
| 5,051,020 | A | 9/1991 | Schleicher |
| 5,133,206 | A | 7/1992 | Jackson |
| 5,181,315 | A | 1/1993 | Goodsmith |
| 5,502,884 | A | 4/1996 | Ladouceur |
| 5,528,815 | A | 6/1996 | Webb |
| 5,678,970 | A | 10/1997 | Caulk |
| 5,752,305 | A | 5/1998 | Cotterill et al. |
| 5,779,127 | A | 7/1998 | Blacket et al. |
| 6,106,446 | A | 8/2000 | Kelly et al. |
| 6,135,933 | A | 10/2000 | Kelly et al. |
| 6,205,640 | B1 | 3/2001 | Dubugnon |
| 6,405,420 | B1 | 6/2002 | Donhauser et al. |
| 6,722,013 | B1 | 4/2004 | Rapp |
| 6,763,568 | B1 | 7/2004 | Mauermann et al. |
| 7,287,411 | B2 | 10/2007 | Kuhne |
| 7,425,111 | B2 | 9/2008 | Ladouceur |
| 7,681,296 | B2 | 3/2010 | Rapp |
| 2006/0010671 | A1 | 1/2006 | Mair et al. |
| 2006/0163309 | A1 | 7/2006 | Merk |
| 2008/0016935 | A1 | 1/2008 | Rotter et al. |
| 2008/0066286 | A1 | 3/2008 | Saathoff |
| 2009/0107204 | A1 | 4/2009 | Widdel et al. |
| 2010/0135744 | A1 | 6/2010 | Babej et al. |

FOREIGN PATENT DOCUMENTS

| | | |
|---|---|---|
| DE | 4419065 | 12/1995 |
| DE | 19524164 | 9/1996 |
| DE | 19927101 | 12/2000 |
| DE | 19940038 | 7/2001 |
| DE | 10056859 | 5/2002 |
| EP | 0387430 | 9/1990 |
| EP | 0541148 | 5/1993 |
| EP | 0567240 | 10/1993 |
| EP | 0815980 | 1/1998 |
| EP | 0893180 | 1/1999 |
| EP | 0922538 | 6/1999 |
| EP | 0983810 | 8/2000 |
| EP | 1477249 | 11/2004 |
| EP | 1690613 | 8/2006 |
| GB | 2184677 | 7/1987 |
| IT | 1243844 | 6/1994 |
| JP | 69077161 | 5/1984 |
| JP | 2001304214 | 10/2001 |
| JP | 2003290866 | 10/2003 |
| JP | 2003305531 | 10/2003 |
| JP | 2004001045 | 1/2004 |
| JP | 2004358496 | 12/2004 |
| WO | 8907020 | 8/1989 |
| WO | 9309918 | 5/1993 |
| WO | 9310925 | 5/1993 |
| WO | 9415736 | 6/1993 |
| WO | 9509307 | 4/1995 |
| WO | 9535174 | 12/1995 |
| WO | 9921668 | 5/1999 |
| WO | 0018528 | 4/2000 |
| WO | 0076688 | 12/2000 |
| WO | 0211944 | 2/2002 |
| WO | 03061869 | 7/2003 |
| WO | 2006015785 | 2/2006 |
| WO | 2007112720 | 10/2007 |
| WO | 2007137367 | 12/2007 |

OTHER PUBLICATIONS

U.S. Appl. No. 13/882,836, Application and Drawings, filed May 1, 2013, 58 pages.
PCT/GB2011/001586 International Preliminary Report on Patentability mailed Jan. 21, 2013 (17 Pages).
Office Action from the US Patent and Trademark Office for U.S. Appl. No. 13/882,836, filed Mar. 25, 2015 (11 pages).
EP14176140.3 Extended European Search Report dated Sep. 22, 2015 (6 pages).
Office Action from the Japanese Patent Office for Application No. 2014-106216 dated Sep. 15, 2015 (11 pages.).
EP11791608.0 Communication pursuant to Article 94(3) from the European Patent Convention dated Sep. 17, 2015 (5 pages).

* cited by examiner

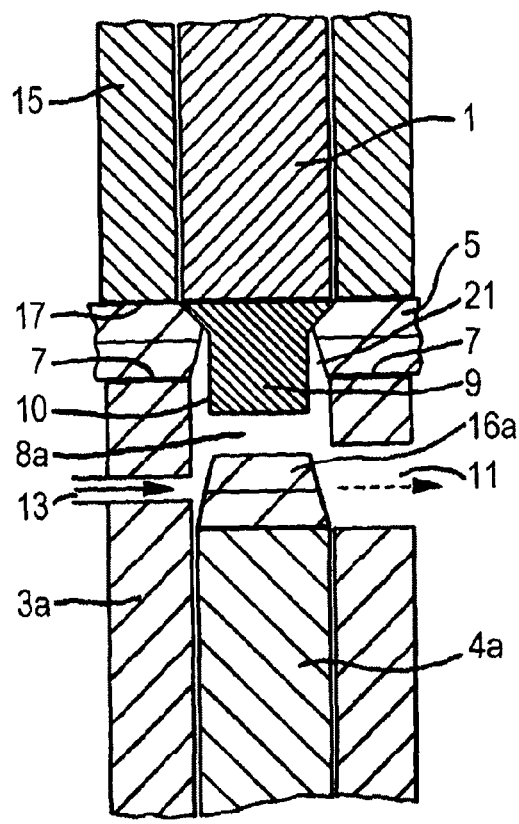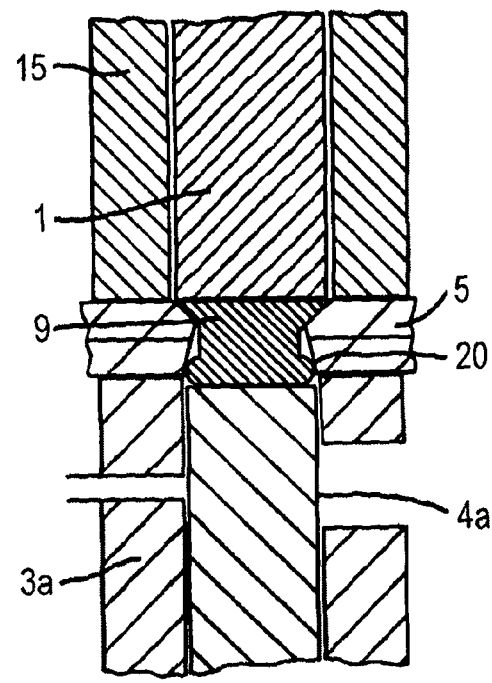
Fig. 3a
Fig. 3b

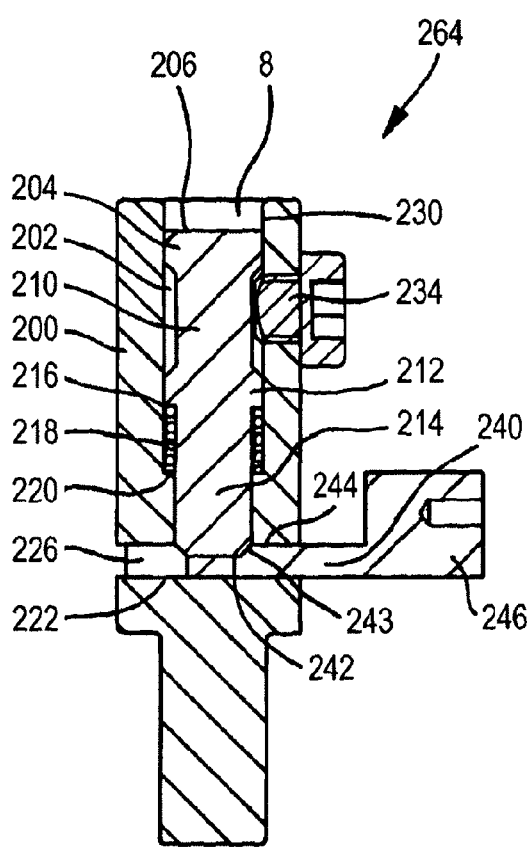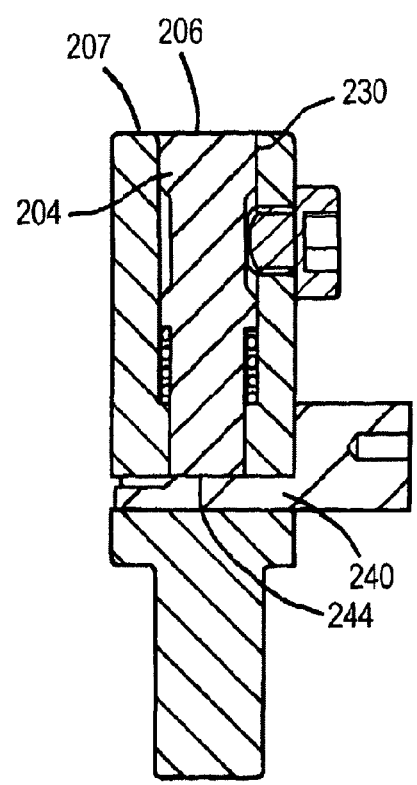
Fig. 5
Fig. 6

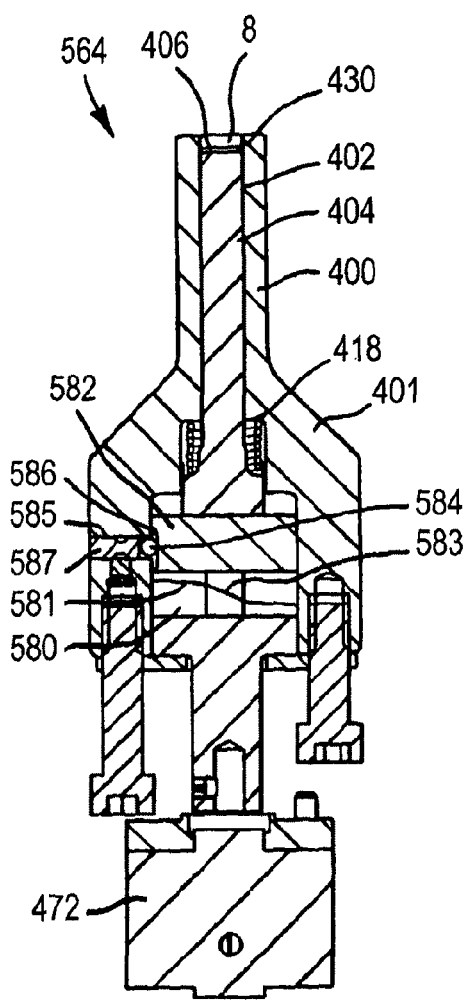
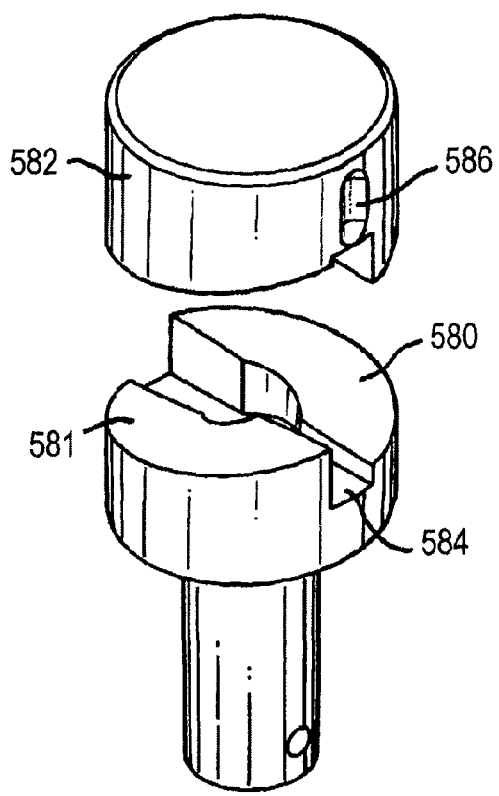
Fig. 10
Fig. 11

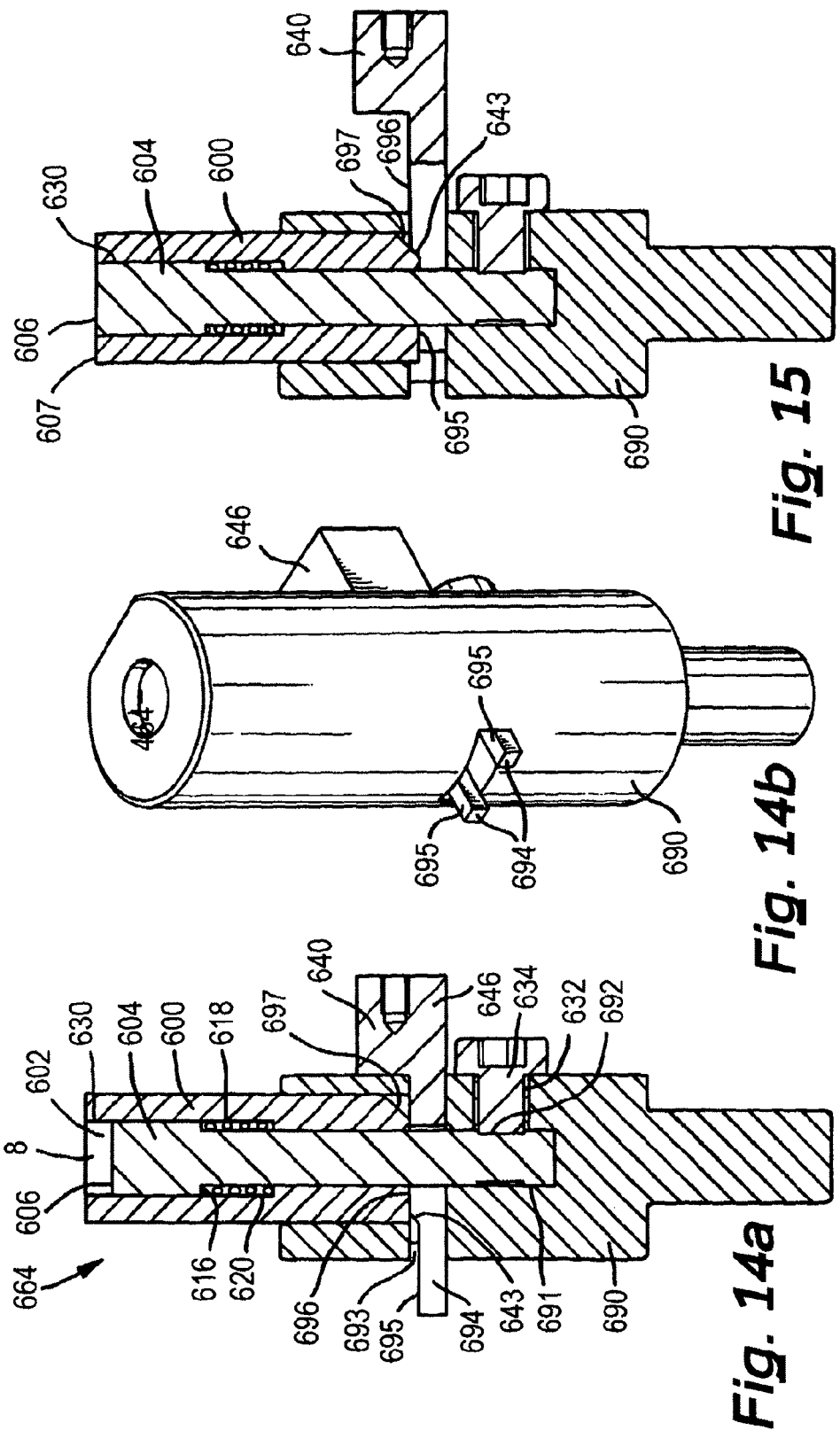

RIVETING METHOD AND APPARATUS

BACKGROUND OF THE INVENTION

I. Field of the Invention

The present invention relates to a riveting method and apparatus.

II. Description of Related Art

Conventional riveting methods comprise at least three steps. These are drilling of a hole to receive a rivet, insertion of the rivet into the hole, and upsetting the shank of the rivet to a diameter which is wider than the diameter of the hole.

It is desirable to provide a riveting method and apparatus which is more efficient than conventional riveting methods.

SUMMARY OF THE INVENTION

According to a first aspect of the invention there is provided a method of riveting comprising using a punch to push a rivet through a workpiece such that a shank of the rivet is received in a die defined by a die body which is in contact with the workpiece, a slug of material being removed from the workpiece by the rivet and being received in the die, the method further comprising closing or substantially closing the die using a rod and using the rod to upset the shank of the rivet, or closing or substantially closing the die using a rod and the slug of material and using the rod and the slug of material to upset the shank of the rivet.

Upsetting of the shank of the rivet may take place after the die has been closed or may take place during closing of the die.

The method may further comprise removing the slug of material from the die before the shank of the rivet is upset, and using an upper surface of the rod to upset the shank of the rivet.

An upper surface of the slug of material may be used to upset the shank of the rivet.

The method is advantageous because it provides insertion and upsetting of the rivet using a single apparatus. It avoids the requirement to use for example a first apparatus to drill a hole to receive a rivet, a second apparatus to insert the rivet into the hole, and a third apparatus to upset the shank of the rivet.

An upper surface of the die body may be used in combination with the upper surface of the rod to upset the shank of the rivet.

The diameter of the die may be sufficiently greater than the diameter of the rivet shank to allow a flattened portion of the rivet shank to be accommodated in the die during upsetting of the rivet.

The die may be closed or substantially closed by moving the rod within the die body.

The position of the rod within the die body may be determined by an adjustable end stop.

The adjustable end stop may have a plurality of surfaces, and may be moveable between a first configuration in which the rod is in contact with a first adjustable end stop surface and is withdrawn within the die body to form the die, and a second configuration in which the rod is in contact with a second adjustable end stop surface and the rod closes or substantially closes the die.

The adjustable end stop may comprise a cam which is moveable between a plurality of configurations in which the rod is in contact with the cam, the cam moving the rod between a withdrawn rod position within the die body to form the die and a rod position which closes or substantially closes the die.

The cam may be a plate which is configured to rotate about an axis of rotation.

The rod may include a threaded portion, and rotation of the rod or rotation of a correspondingly threaded actuator may be used to move the rod.

The die may be closed or substantially closed by moving the die body over the rod.

The position of the die body may be determined by an adjustable end stop.

When the die is closed an upper surface of the rod may be co-planar with or substantially co-planar with an upper surface of the die body.

The relative position of the rod and the die body may be determined by one or more actuators.

The one or more actuators may be controlled by a control apparatus.

The slug of material may be removed from the die through an opening in a side of the die body.

A jet of gas or an arm may be used to push or pull the slug of material through the opening in the side of the die body. Alternatively, a vacuum, magnet or other suitable means may be used to draw the slug of material through the opening in the side of the die body.

According to a second aspect of the invention there is provided a method of manufacturing a product or a sub-assembly comprising riveting one or more workpieces in accordance with any preceding claim.

According to a third aspect of the invention there is provided a riveting apparatus comprising a punch and a die defined by a die body, the punch being configured to push a rivet through a workpiece such that a shank of the rivet is received in the die, wherein the apparatus further comprises a rod which is configured to close or substantially close the die and to upset the shank of the rivet, either in combination with a slug of material removed from the workpiece or without a slug of material removed from the workpiece.

The apparatus may be configured to close or substantially close the die such that an upper surface of the rod may be used to upset the shank of the rivet, or such that an upper surface of a slug of material removed from the workpiece by the rivet may be used to upset the shank of the rivet.

An upper surface of the die body may be configured such that it may combine with the upper surface of the rod to form a combined upsetting surface.

The rod and die body may be configured such that an upper surface of the rod may be made co-planar with or substantially co-planar with an upper surface of the die body.

The rod may be moveable within the die body to close or substantially close the die.

The position of the rod within the die body may be determined by an adjustable end stop.

The adjustable end stop may have a plurality of surfaces, and may be moveable between a first configuration in which the rod is in contact with a first adjustable end stop surface and is withdrawn within the die body to form the die, and a second configuration in which the rod is in contact with a second adjustable end stop surface and the rod closes or substantially closes the die.

The adjustable end stop may comprise a cam which is moveable between a plurality of configurations in which the rod is in contact with the cam, the cam moving the rod between a withdrawn rod position within the die body to form the die and a rod position which closes or substantially closes the die.

The cam may be a plate which is configured to rotate about an axis of rotation.

The rod may include a threaded portion and may be configured such that rotation of the rod or rotation of a correspondingly threaded actuator will move the rod.

The die body may be moveable over the rod to close or substantially close the die.

The position of the die body may be determined by an adjustable end stop.

The relative position of the rod and the die body may be determined by one or more actuators.

The one or more actuators may be controlled by a control apparatus.

The apparatus may further comprise a mechanism configured to remove a slug of material from the die.

The mechanism may comprise an opening in a side of the die body, and may further comprise a channel configured to deliver a jet of gas arranged to push or pull the slug of material through the opening, an arm configured to push the slug of material through the opening, or a vacuum source, magnet or other means configured to draw the slug of material through the opening.

According to a fourth aspect of the invention these is provided a fastening system comprising the fastening apparatus of the third aspect of the invention and further comprising a rivet feeding system and a control system.

BRIEF DESCRIPTION OF THE DRAWINGS

Specific embodiments of the present invention will now be described with reference to the accompanying drawings by way of example only, in which:

FIG. 3 is two cross-sectional views of a riveting apparatus according to an alternative embodiment of the present invention which show insertion and upsetting of a rivet;

FIG. 5 is a cross-sectional view of a die assembly which may form part of an alternative embodiment of the invention in a first configuration;

FIG. 6 is a cross-sectional view of the die assembly of FIG. 5 in a second configuration;

FIG. 10 is a cross-sectional view of a die assembly which may form part of an alternative embodiment of the invention in a first configuration;

FIG. 11 is an exploded view of part of the die assembly of FIG. 10;

FIG. 14 is a cross-sectional view and a perspective view of a die assembly which may form part of an alternative embodiment of the invention in a first configuration;

FIG. 15 is a cross-sectional view of the die assembly of FIG. 14 in a second configuration;

DETAILED DESCRIPTION

Figure 1:
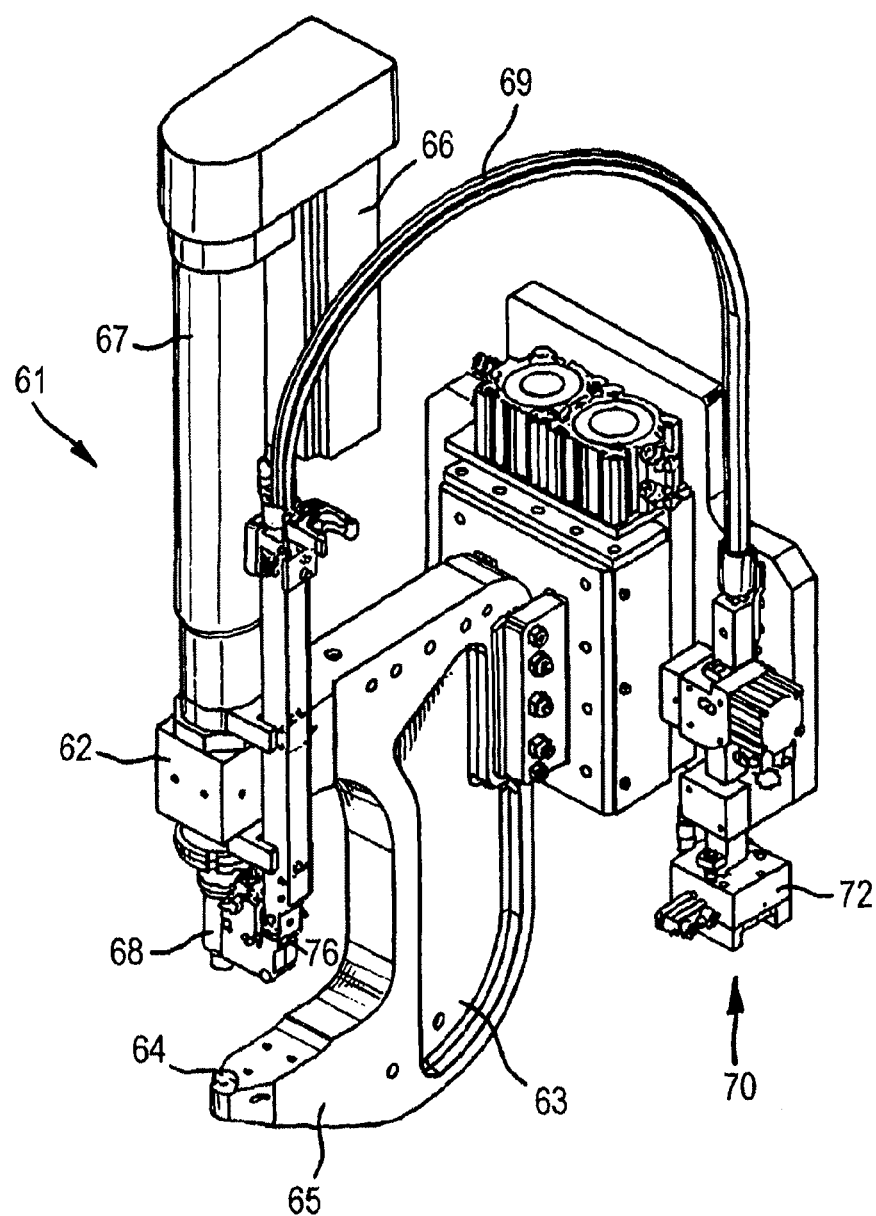
FIG. 1 is a perspective view of a riveting apparatus and carrier according to an embodiment of the present invention.

FIG. 1 shows a riveting apparatus 61 and carrier according to an embodiment of the invention. The carrier comprises a C-frame 63 which has an upper jaw 62 and a lower jaw 65. A die assembly 64 is provided on the lower jaw 65 of the C-frame. The riveting apparatus 61 pushes rivets through a workpiece (not shown) which is located over the die assembly 64.

The riveting apparatus 61 comprises an electric drive 66 (other types of drive such as hydraulic or pneumatic can be used) that operates to drive a reciprocal punch (hidden in FIG. 1) in a cylindrical housing 67 and a nose assembly 68. The reciprocal punch is used to insert rivets from the nose assembly 68 through a workpiece. The riveting apparatus 61 may further comprise an additional drive (not shown) which may be used to clamp the nose assembly 68 onto the workpiece during insertion of a rivet (and optionally during upsetting of the rivet). The electric drive 66 and the additional drive may be independently controllable (e.g. using a control apparatus). The additional drive may for example be an electric drive, hydraulic drive or a pneumatic drive. An example of a drive which may be used to clamp a nose onto a workpiece is described in U.S. Pat. No. 5,752,305 which is herein incorporated by reference.

Rivets are supplied under air or gas pressure from a bulk feeder (not shown) via a delivery tube 69. Supplied rivets pass through the delivery tube 69 to a feeder assembly 76 that is mounted immediately adjacent to the nose assembly 68. The rivets are then transferred from the feeder assembly 76 into the nose assembly 68 from where they are inserted through the workpiece. Alternatively, the rivets may be supplied by transportation to the nose assembly 68 in carrier tape (not shown). After a rivet has been inserted into the workpiece the shank of the rivet is upset using an upsetting surface provided by the assembly 64. This provides an increased diameter portion at the end of the rivet and secures the rivet in place in the workpiece.

A fastening system may comprise the fastening apparatus described above, and may further comprise a rivet feeding system 70 and a control system 71. The rivet feeding system is configured to deliver rivets via a connector 72 of the fastener apparatus to the delivery tube 69. The control system 71 is configured to control delivery of rivets to the nose assembly 68, and is configured to control operation of the reciprocal punch.

FIG. 2 shows schematically a riveting method and apparatus according to an embodiment of the invention. FIG. 2a shows schematically in cross-section a riveting apparatus which comprises a punch 1 accommodated in a nose 15 and a rod 4 accommodated in a die body 3. A workpiece 5 which comprises two sheets of material is located between an upper surface 7 of the die body 3 and a lower surface 17 of the nose 15. Although the illustrated workpiece 5 comprises two sheets of material, the workpiece may comprise any number of sheets of material.

A rivet 9 is located within the nose 15 beneath the punch 1. As may be seen from FIG. 2a, the rivet 9 is a solid rivet, that is to say that the shank 10 of the rivet does not include a semi-tubular recess but it instead has a flat or substantially flat end surface 12. A head 14 of the rivet 9 is shown with a countersunk form but other forms may be appropriate depending on the application.

An opening 11 is provided in the side of the die body 3, the opening being sufficiently large to allow removal of a slug of material from a bore 2 in the die body as described further below. A channel 13 is provided on an opposite side of the die body from the opening 11.

Figure 2A:
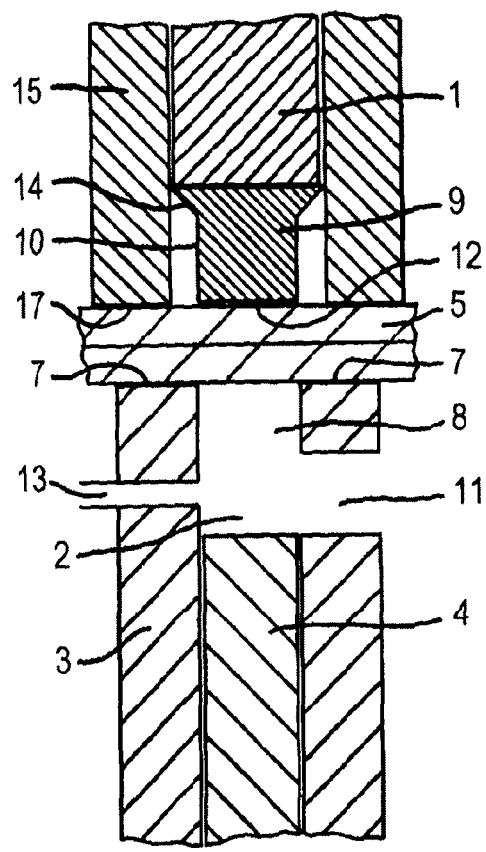
FIG. 2 is four cross-sectional views of a riveting apparatus according to an embodiment of the present invention which show insertion and upsetting of a rivet.

In FIG. 2a the rivet 9 has been delivered by a nose assembly (see FIG. 1) to a position in the nose 15 which is immediately above the workpiece 5. The punch 1 is shown in a position which is immediately above the rivet 9, the punch being ready to push the rivet into the workpiece 5.

Figure 2B:
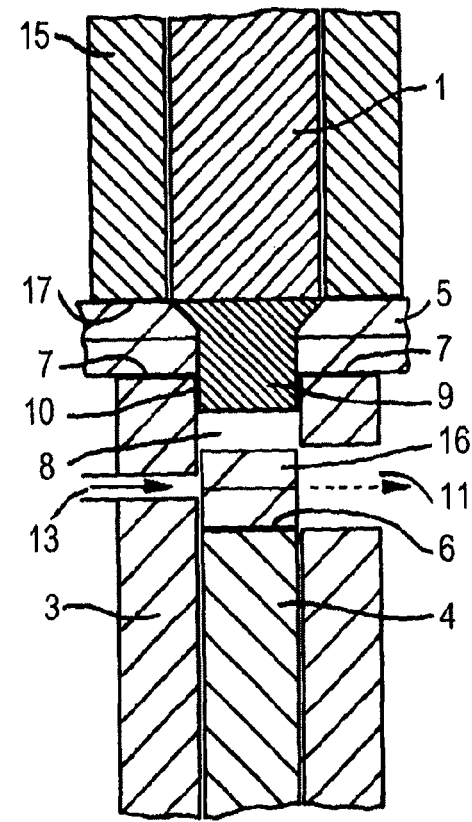

Referring to FIG. 2b, the punch 1 has pushed the rivet 9 into the workpiece 5 such that a lower portion of the shank 10 of the rivet projects beyond the workpiece and into the bore 2. Insertion of the rivet 9 through the workpiece 5 causes a slug 16 of material to be pushed out of the workpiece. The nose 15 clamps the workpiece 5 to the die body 3 during insertion of the rivet 9, thereby resisting bending deformation of the workpiece during insertion of the rivet. An upper end of the bore 2 in the die body 3 forms a die 8 of the riveting apparatus. The die 8 provides a space into which a slug of workpiece material 16 is sheared from the workpiece 5 by the rivet 9 through the action of the rivet and die. The perimeter of the slug 16 is determined by the perimeter of the die 8.

Once the slug of material 16 has been pushed from the workpiece 5, the slug of material falls into the die 8. The rod 4 is withdrawn sufficiently far into the bore 2 that the die 8 is sufficiently deep to accommodate the slug of material 16. The die 8 is also sufficiently deep to accommodate a lower portion of the shank 10 of the rivet 9 which protrudes from the workpiece 5. The slug of material 16 may rest upon an upper surface 6 of the rod 4 as is shown in FIG. 2b. A jet of gas (e.g. air) is delivered from the channel 13 as indicated by the arrow. The jet of gas pushes the slug of material 16 through the opening 11 and out of the die 8, as indicated by the dotted arrow. The slug of material may pass into a waste receptacle (not shown). In an alternative arrangement (not illustrated) a retractable arm may be used instead of the jet of gas to push (or pull) the slug of material 16 through the opening 11. In a further alternative embodiment (not illustrated) a vacuum may be applied through the opening 11, the vacuum drawing the slug of material 16 through the opening. Alternatively, a magnet or other suitable means may be used to draw the slug of material through the opening 11.

Figure 2C:
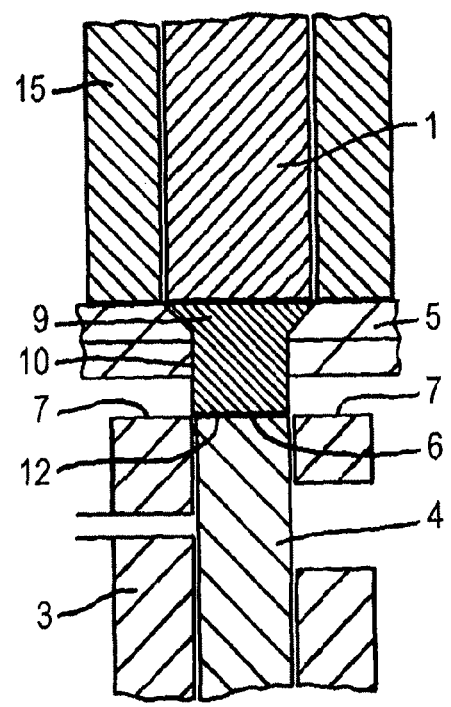

Referring to FIG. 2c, once the slug of material has been removed from the die 8, the rod 4 is moved upwards relative to the die body 3 (or the die body is moved downwards relative to the rod) such that it closes the die (or substantially closes the die). As shown in FIG. 2c, the upper surface 6 of the rod 4 may be co-planar (or substantially co-planar) with the upper surface 7 of the die body 3. The upper surface 6 of the rod 4 and the upper surface 7 of the die body 3 may together act as a rivet upsetting surface.

Before the die 8 is closed, or at the same time as closing the die, the separation between the die body 3 and the nose 15 and punch 1 is increased (the increased separation may be seen by comparing FIGS. 2b and 2c). If the die 8 is closed by moving the rod 4 upward within the die body 3 without moving the die body, then the nose 15 and punch 1 may be moved up slightly to provide the increased separation. This upward movement of the nose 15 and punch 1 may be accompanied by a corresponding downward movement of the C-frame 63 (see FIG. 1) of the riveting apparatus, such that the punch remains in contact with the rivet 9.

If the die 8 is closed by moving the die body 3 downward relative to the rod 4, increased separation between the nose and punch and the die body is provided by the movement of the die body. The C-frame 63 of the riveting apparatus may be moved upwards so that the upper surface 7 of the die body 3 is located in a plane that is immediately below the rivet 9. Where this is the case, the nose 15 and punch 1 may be moved downward such that the punch remains in contact with the rivet 9.

Referring again to FIG. 1, the C-frame 63 of the riveting apparatus may be provided on a moveable robot arm or air balanced slide (not shown), and free upward or downward movement of the riveting apparatus may be achieved through free downward or upward movement of the moveable robot arm or air balanced slide. In this context the term 'free movement' may be interpreted as meaning that the C-frame 63 reacts to movement of the punch 1, nose 15, rod 4 and die body 3 as though it has no weight (it does not move downwards under its own weight). For example, if the punch 1 and nose 15 are in contact with the rivet 9, and neither the rod 4 nor the die body 3 are in contact with the rivet or workpiece 5, then moving the nose and punch downwards will cause the C-frame 63 to move upwards. Once the downward movement of the punch 1 and nose 15 has finished, the C-frame 63 does not continue to move upwards (movement of the C-frame is damped rather than being fully analogous to weightlessness). If the punch 1 and nose 15 are in contact with the rivet 9, and neither the rod 4 nor the die body 3 are in contact with the rivet or workpiece 5, then moving the punch 1 and nose 15 upwards will not cause the C-frame 63 to move downwards. Instead, the C-frame 63 remains stationary or may for example move slightly. Movement of the C-frame may be automated and may be controlled by a control apparatus. Alternatively, the C-frame of the riveting apparatus may form part of a manually operated tool, which may for example be provided on a tool balancer. Where this is the case, motion of the riveting apparatus may be controlled and/or absorbed by the operator of the riveting apparatus.

The net result of the movement is shown in FIG. 2c. The end surface 12 of the rivet shank 10 is in contact with the upper surface 6 of the rod 4, the punch 1 is in contact with the rivet 9, and the nose 15 is in contact with the workpiece 5. The punch 1 is then pressed against the rivet 9 to upset the rivet.

Figure 2D:
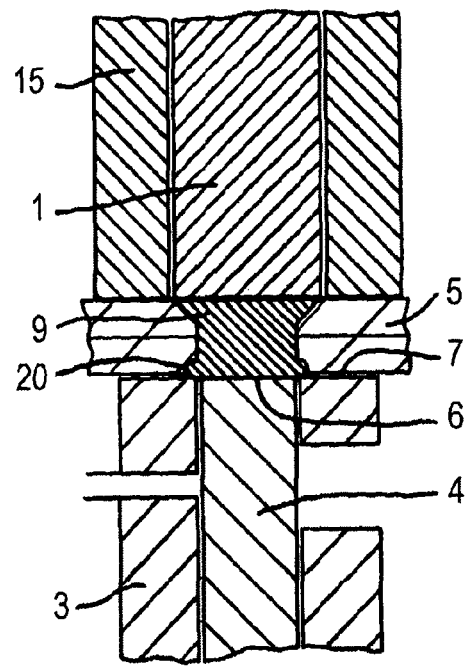

Referring to FIG. 2d, the punch 1 pushes the rivet 9 against the rod 4, causing upsetting of the rivet against the upper surface 6 of the rod and the upper surface 7 of the die body 3. During upsetting of the rivet 9 the nose 15 may be held in position in contact with the workpiece 5. The nose 15 may be held in position such that it resists upward movement of the workpiece but does not press against the workpiece. Alternatively, the nose 15 may press against the workpiece. However, the nose 15 does not apply the same amount of force as the punch 1, since applying that amount of force could push the workpiece 5 downwards relative to the rivet 9. As a result of the force applied by the punch 1 against the rivet 9, the lower end of the rivet shank 10 is compressed and expands to form a flattened portion 20 at the tail of the rivet. Part of the flattened portion 20 may be pressed into the workpiece 5. The flattened portion 20 of the rivet 9 together with the head 14 securely hold the rivet in the workpiece 5, thereby providing secure fastening together of the sheets of material which comprise the workpiece. In general, one or more of the punch 1, die body 3 and rod 4 may be moved relative to one another (and the C-frame 63 may also be moved), in order to provide the configuration shown in FIG. 2c wherein the punch 1 is in contact with the head of the rivet 9 and the upper surface 6 of the rod 4 and the upper surface 7 of the die body 3 are in a plane which is immediately beneath the rivet.

In FIG. 2d it has been assumed that the die body 3 and rod 4 are stationary and the workpiece 5 moves downwards when during upsetting of the rivet. In an alternative arrangement the workpiece 5 is stationary, and the die body 3 and rod 4 move upwards during upsetting of the rivet instead of the workpiece moving downwards (the upward movement being provided by the C-frame of the riveting apparatus).

The mechanism used in FIG. 2b to remove the slug of material 16 comprises an opening in the side of the die body 3 and a channel 13 which provides a jet of gas which pushes the slug of material through the opening. As mentioned above a retractable arm may be used to push the slug of material through the opening, or a vacuum may be used to draw the slug of material through the opening. Any other suitable means may be used to make the slug of material pass through the opening. In an alternative arrangement a different slug ejection mechanism may be used. For example, the die 8 may be closed, thereby pushing the slug of material 16 out of the die, and a jet of gas or an arm which passes over the top of the die body 3 may be used to push the slug of material into a receptacle (or a vacuum may be used to suck the slug of material off the top of the die body).

FIGS. 2c and 2d show the upper surface 6 of the rod 4 as being co-planar (or substantially co-planar) with the upper surface 7 of the die body 3. However, in an alternative arrangement the upper surface of the rod 4 may protrude beyond the upper surface 7 of the die body 3. Where this is the case, the upper surface of the rod 4 and the upper surface 7 of the die body 3 still both act as upsetting surfaces which upset the rivet 9. However, the upsetting may form a bottom surface on the rivet 9 which includes a recess (caused by the rod 4) instead of being flat. In a further alternative arrangement the upper surface of the rod 4 may be lower than the upper surface 7 of the die body 3. The die 8 may be considered to be substantially closed, since the depth of the die has been reduced substantially (the depth is less than the depth to which the rivet shank 10 extended into the die when the rivet 9 was inserted). Where this is the case, the upper surface of the rod 4 and the upper surface 7 of the die body 3 still both act as upsetting surfaces which upset the rivet 9. However, the upsetting may form a bottom surface on the rivet 9 which includes a protrusion instead of being flat. Adjustment in this manner of the upsetting surface formed by the upper surface 6 of the rod 4 and the upper surface 7 of the die body 3 may for example provide some control of the upsetting of the rivet. It may for example allow an upsetting displacement of the rivet 9 to be modified without modifying the movement of the punch. This may for example allow rivets of different lengths to the inserted and upset using the riveting apparatus (e.g. without modifying the movement of the punch or in combination with a modified movement of the punch). Alternatively, it may allow rivets to be inserted and upset in workpieces of different thicknesses, or workpieces comprising different materials, using the riveting apparatus (e.g. without modifying the movement of the punch or in combination with a modified movement of the punch).

In the embodiment illustrated in FIG. 2 the diameter of the die 8 is substantially equal to the diameter of the rivet shank 10. However, in an alternative embodiment of the invention the diameter of the die may be significantly greater than the diameter of a rivet shank which is to be received by the die (e.g. the diameter of the die may for example be 1-2 mm or more greater than the diameter of the rivet shank). This is shown schematically in FIG. 3. FIG. 3 corresponds largely with FIG. 2, and corresponding reference numerals have been used for elements which are unchanged.

Referring to FIG. 3a, the die body 3a is provided with a wider bore than the bore in FIG. 2, an upper end of the bore forming a die 8a. A rod 4a which is provided in the bore has a correspondingly larger diameter. The die 8a has a diameter which is significantly greater than the shank 10 of a rivet 9 that is inserted through the workpiece 5 by the punch 1. As a result of this difference in diameter, the slug of material 16a which is pushed from the workpiece 5 is not cylindrical but instead is wider at a bottom end than at a top end. A correspondingly shaped hole 21 is formed in the workpiece 5.

The slug of material 16a is removed from the die 8a via the opening 11 using the mechanism described above in relation to FIG. 2. The rod 4a is then moved upwards such that it presses against the a bottom surface 12 of the rivet shank 10. The rod 4a is used to apply force which upsets the shank 10 of the rivet to form a flattened portion 20 at the tail of the rivet, as shown in FIG. 3b. Although the die 8a is not fully closed in FIG. 3b, it may be considered to be substantially closed. The flattened portion 20 may be at least partially accommodated in the die 8a during upsetting of the rivet (the diameter of the die 8a is sufficiently wide to accommodate the flattened portion). Some or all of the flattened portion 20 may be pushed into the hole 21 in the workpiece 5. The shape of the flattened portion 20 may differ significantly from the shape shown in FIG. 3b (FIG. 3b is merely intended to provide a schematic representation of the flattened portion). In this embodiment it is the rod 4a which provides upsetting of the rivet by pushing up on the bottom surface of the rivet, instead of the punch 1 providing upsetting of the rivet by pushing down on the top surface of the rivet (as is done in the embodiment shown in FIG. 2).

In the riveting method shown in FIG. 2 the die body 3 is moved out of contact with the workpiece 5 in order to move the rivet shank 10 out of the die 8 (see FIG. 2c). The upper surface 7 of the die body 3 and the upper surface 6 of the rod 4 then form an upsetting surface which is used to upset the rivet 9 (see FIG. 2d). In contrast to this, in the riveting method shown in FIG. 3 there is no need to move the rivet shank 10 out of the die 8a because the die is sufficiently wide to accommodate the flattened portion 20 of the rivet during upsetting of the rivet. Therefore, the die body 3a may remain in contact with the workpiece 5 after the slug of material 16a has been pushed from the workpiece, the die body 3a remaining in contact with the workpiece before and during upsetting of the rivet 9. This allows the nose 15 to clamp the workpiece 5 to the die body 3a during insertion and upsetting of the rivet 9 (the workpiece may be clamped throughout this process). It also allows a significant simplification of the movement of the riveting apparatus, for example avoiding moving the C-frame 63 between insertion of the rivet 9 and upsetting of the rivet. Insertion and upsetting of the rivet may for example comprise only two movements: downward movement of the punch 1 to push the rivet 9 through the workpiece, and upward movement of the rod 4a to upset the rivet 9.

In an embodiment, the slug of material 16, 16a may be retained in the die 8, 8a during upsetting of the rivet shank 10. Where this is done, an upper surface of the slug of material 16, 16a may form an upsetting surface which upsets the rivet shank 10. In this embodiment the die may be considered to be closed by the rod and the slug of material in combination. Similarly, the rivet may be considered to be upset by the rod and the slug of material in combination. The slug of material 16, 16a may be removed from the die 8, 8a once the rivet shank 10 has been upset.

FIGS. 4-13 show various die assemblies in which the rod may be moved within the die body using various different actuation mechanisms.

Figure 4A:
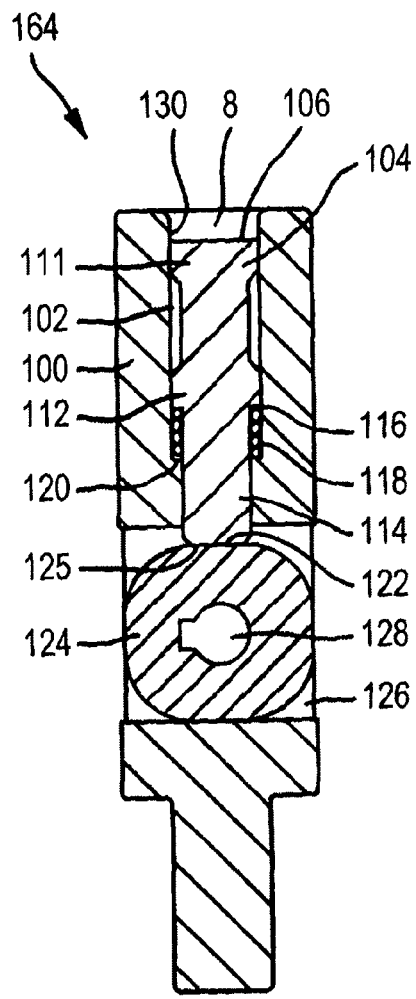
FIG. 4 is three cross-sectional views of a die assembly which may form part of an embodiment of the invention.
Figure 4B:
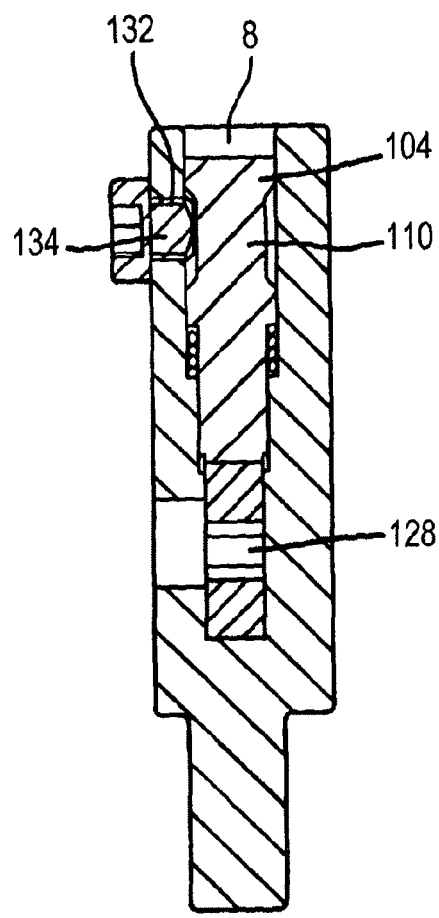

FIG. 4a shows a die assembly which may form part of an embodiment of the invention in cross-section viewed from one side, and FIG. 4b shows the die assembly in cross-section but rotated through 90 degrees. The die assembly 164 comprises a die body 100 within which a generally cylindrical bore 102 is provided. A rod 104 is located within the bore 102. The rod 104 is provided at an upper end with a substantially flat upper surface 106. An upper end of the bore 102 defines a die 8 into which a shank of a rivet may extend during fastening. An opening from which a slug of workpiece material may be removed is not shown in FIG. 4a or FIG. 4b, nor is a channel through which gas may be supplied. However, these may be provided in the die assembly 164 in the same way as shown in FIGS. 2 and 3.

An upper end of the rod 104 has a diameter which substantially corresponds with the diameter of the bore 102 such that the upper end of the rod 104 does not move laterally within the bore (although a small degree of lateral movement may arise from tolerances in the size of the rod and the bore during their manufacture). A lower end 122 of the rod 104 is bevelled to assist insertion of the rod into the bore 102. The rod 104 includes a portion having a reduced diameter 110 which connects an upper portion 111 of the rod with a central portion 112, the central portion having a diameter which is substantially equal to the diameter of the upper portion. A lower portion 114 of the rod has a reduced diameter and connects to the central portion 112 at a step 116 at which the diameter of the rod increases. A helical spring 118 abuts against the step 116. An opposite end of the helical spring 118 abuts against a step 120 at which the diameter of the bore 102 reduces. The helical spring 118 resiliently biases the rod 104 upwards. The reduced diameter of the bore 102 substantially corresponds with the diameter of the lower portion 114 of the rod 104.

In the absence of external forces, the bias provided by the helical spring 118 pushes the rod 104 upwards so that it is not in contact with the adjustable end stop 124. However, when the punch 1 pushes a slug of workpiece material 16 into the die 8 (as shown in FIG. 2b and FIG. 3a) this will push the rod downwards. This provides sufficient depth within the die 8 to accommodate the slug of workpiece material 16 and the lower end of the rivet shank 10.

A rotatably mounted adjustable end stop 124 is provided in an opening 126 within the die body 100. The adjustable end stop 124 is provided with four substantially flat surfaces, each of which is arranged to provide a contact surface which receives a lowermost end 122 of the rod 104. The adjustable end stop 124 is provided with an opening 128 which receives an actuator rod (not shown) that is used to rotate the adjustable end stop. The adjustable end stop opening 128 is generally circular but includes a slot which may help to ensure that the actuator grips the adjustable end stop 124 and is able to rotate it (rather than rotating within the adjustable end stop opening).

A threaded bore 132 is provided on one side of the die body 100, and a threaded plug 134 is held in the threaded bore. The threaded plug 134 extends into the bore 102 at a location which corresponds with the location of the reduced diameter section 110 of the rod 104. The threaded plug 134 thus restricts movement of the rod 104, for example preventing the rod from falling out of the bore 102.

In use, the adjustable end stop 124 has a first configuration as shown in FIG. 4a. The helical spring 118 is in compression and pushes the rod 104 upwards such that its lowermost end 122 is raised above a surface 125 of the adjustable end stop 124. However, when a rivet is being inserted into a workpiece the rod 104 is pushed downwards by a slug of material that is pushed from the workpiece. The resilient biasing force provided by the helical spring 118 is less than the force exerted by the punch 1 and rivet 9 (see FIGS. 2 and 3). The rod 104 is pushed sufficiently far downward that the slug of material (not shown) that is pushed from the workpiece may be accommodated in the die 8 and a portion of the shank of the rivet may also be accommodated in the die.

Figure 4C:
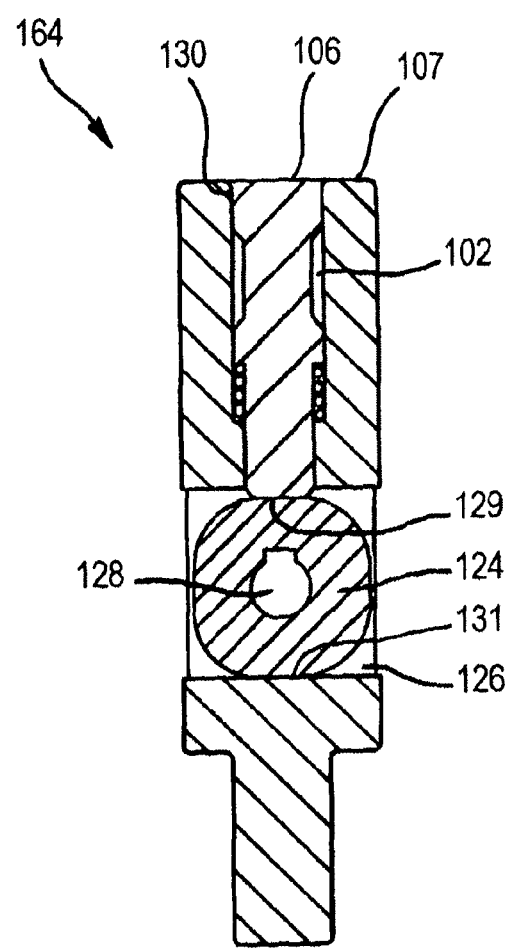

The slug of material is ejected from the die 8, for example using one of the mechanisms described further above. The rotatably mounted adjustable end stop 124 is then used to move the rod 104 upwards such that it closes or substantially closes the die 8. In FIG. 4c the adjustable end stop 124 has been rotated through 90°. The vertical diameter of the adjustable end stop 124 is greater than the vertical diameter of the adjustable end stop in the configuration shown in FIG. 4a (the smaller diameter of the adjustable end stop is now the horizontal diameter of the adjustable end stop). As a result, the adjustable end stop 124 pushes the rod 104 further up the bore 102. The position of the rod 104 is such that the die 8 is closed, and the upper surface 106 of the rod is co-planar (or substantially co-planar) with an upper surface 107 of the die body 100. The upper surface 106 of the rod 104 and the upper surface 107 of the die body 100 provide an upsetting surface which may be used to upset the rivet via the application of force using the punch 1 (see FIG. 2).

As may be appreciated from comparison of FIG. 4a and FIG. 4c, the adjustable end stop opening 128 moves upwards when the adjustable end stop 124 is rotated from the first configuration to the second configuration. The upward movement of the adjustable end stop opening 128 is half of the upward movement of the rod 104, and may for example be 0.5 mm. The actuator (not shown) which is used to rotate the adjustable end stop 124 is configured to be able to accommodate this movement of the adjustable end stop opening 128.

A substantially flat surface 131 of the adjustable end stop 124 which is opposite to the rod 104 is in contact with a bottom surface of the opening 126 of the die body 100. The adjustable end stop 124 is formed from a material which is sufficiently strong to resist significant deformation when pressure is applied to the rod 104 during upsetting of the rivet. Pressure which is applied via the rod 104 to the adjustable end stop 124 passes from the adjustable end stop to the lowermost surface of the opening 126 and from there is transferred to a lower jaw 65 of the C-frame 63 (see FIG. 1).

The helical spring 118 is in compression and separates the rod 104 from the adjustable end stop 124 when no downward force is being applied to the helical spring. Thus, once the slug of material has been removed from the die 8, the rod 104 moves upwards and rotation of the adjustable end stop 124 to close the die with the rod 104 occurs when the rod is not in contact with the adjustable end stop. This reduces wear of the adjustable end stop 124 and the rod 104. A further advantage of the helical spring 118 is that if the threaded plug 134 is unscrewed to allow free movement of the rod 104, then the helical spring 118 will push the rod upwards so that it is proud of the die body 100 thereby allowing the rod to be easily removed from the die body (e.g. to replace the rod). The helical spring 118 may also allow easier assembly of the die assembly.

The shape of the adjustable end stop 124 may be such that an upper end of the rod 104 may be pushed beyond the top of the die body 100 when rotating the adjustable end stop between the configuration shown in FIG. 4a and the configuration shown in FIG. 4c. For this reason, a separation may be provided between the die body 100 and the rivet 9 when rotating the adjustable end stop 124.

Although a helical spring 118 is used to separate the rod 104 from the adjustable end stop 124, any suitable biasing means may be used to separate the rod from the adjustable end stop. Although the biasing means provides the advantage that it allows the adjustable end stop 124 to rotate freely, it is not essential that a biasing means is provided. For example, the rod 104 may rest upon the adjustable end stop 124, the adjustable end stop displacing the rod during rotation of the adjustable end stop.

The adjustable end stop 124 is provided with four substantially flat surfaces which limit downward movement of the rod 104. In an alternative arrangement the adjustable end stop 124 may be provided with a different number of substantially flat surfaces, for example six substantially flat surfaces, eight substantially flat surfaces or more. This may for example allow different shapes of upsetting surface to be formed using the upper surface 106 of the rod 104 and the upper surface 107 of the die body 100. For example, instead of selecting a configuration of the adjustable end stop 124 which provides co-planar upper surfaces 106, 107 of the rod and die body, a configuration of the adjustable end stop may be selected which causes the upper surface 106 of the rod to extend beyond the upper surface 107 of the die body. Alternatively, a configuration of the adjustable end stop may be selected which causes the upper surface 106 of the rod to be lower than the upper surface 107 of the die body.

The substantially flat surfaces may lie on opposite sides of an axis of rotation of the adjustable end stop 124 such that when a first substantially flat surface is positioned to provide a contact surface for the rod 104 an opposite substantially flat surface is positioned to provide a contact surface for the die body 100.

The surfaces of the adjustable end stop 124 onto which the rod 104 presses during upsetting of a rivet are flat. This is advantageous because it allows a substantially flat lowermost end 122 of the rod 104 to provide a substantial contact area between the rod and the adjustable end stop 124, thereby allowing force applied to the rod during rivet upsetting to be transmitted into the adjustable end stop. It also allows the adjustable end stop 124 to provide a substantial contact area between the adjustable end stop and the bottom surface of the opening 126 of the die body 100, thereby allowing force applied to the adjustable end stop to be transmitted into the die body. The surfaces of the adjustable end stop 124 may have some other suitable shape (i.e. not substantially flat), with the shape of the lowermost end 122 of the rod 104 and the bottom surface of the opening 126 of the die body 100 being appropriately shaped to provide a substantial contact area with the rod.

The actuator (not shown) may be configured to always rotate the adjustable end stop 124 in the same direction (e.g. clockwise). Alternatively, the actuator may be configured to rotate the adjustable end stop 124 in both the clockwise and anticlockwise directions.

As described above, the adjustable end stop opening 128 moves vertically during rotation of the adjustable end stop 124. The vertical movement may be half of the change in height of the adjustable end stop 124 caused by the rotation, or may be some other amount (this will depend upon the shape of the adjustable end stop). In some arrangements the adjustable end stop opening 128 may remain stationary in the vertical direction during rotation of the adjustable end stop 124.

The position of the adjustable end stop 124 may be controlled by a control apparatus (not shown).

Although the adjustable end stop shown in FIG. 4 has a particular shape, the adjustable end stop may have any suitable shape.

FIG. 5 shows in cross-section a die assembly 264 which may form part of an alternative embodiment of the invention. The die assembly 264 is similar to the die assembly shown in FIG. 4, and comprises a die body 200 provided with a generally cylindrical bore 202 within which a rod 204 is provided. The rod 204 is provided with a substantially flat upper surface 206. The bore 202 defines a die 8 into which a shank of a rivet may extend during fastening.

The rod 204 includes a portion having a reduced diameter 210 which connects an upper portion 211 of the rod with a central portion 212, the central portion having a diameter which is substantially equal to the diameter of the upper portion. A lower portion 214 of the rod has a reduced diameter and connects to the central portion 212 at a step 216 at which the diameter of the rod increases. A helical spring 218 abuts against the step 216. An opposite end of the helical spring 218 abuts against a step 220 at which the diameter of the bore 202 reduces. The helical spring 218 resiliently biases the rod 204 upwards. The reduced diameter of the bore 202 substantially corresponds with the diameter of the lower portion 214 of the rod 204. The lowermost end 222 of the rod 204 is bevelled to assist insertion of the rod into the bore 202. A threaded plug 234 extends into the bore 202 and acts to limit upward movement of the rod 204.

The die body 200 is provided with an opening 226. Unlike the embodiment shown in FIG. 4, a rotatable adjustable end stop is not provided in the opening 226, but instead a stepped adjustable end stop 240 is provided in the opening. The stepped adjustable end stop 240 comprises a first substantially planar surface 242 and a second substantially planar surface 244, the first surface being lower than the second surface. The surfaces 242, 244 are provided on a tongue which extends from a block 246 that is connected to an actuator (not shown). The position of the stepped adjustable end stop 240 may be controlled by a control apparatus (not shown).

A step 243 between the first substantially flat surface 242 and the second substantially flat surface 244 is sloped or profiled. The slope or profile of the step 243 may for example correspond with the corner profile of a lowermost end 222 of the rod 204 (as shown in FIG. 5).

In use, the stepped adjustable end stop 240 has a first configuration as shown in FIG. 5. The helical spring 218 is in compression and pushes the rod 204 upwards such that its lowermost end 222 is raised above a surface 242 of the stepped adjustable end stop 240. However, when a rivet is being inserted into a workpiece the rod 204 is pushed downwards by a slug of material that is pushed from the workpiece because the resilient biasing force provided by the helical spring 218 is less than the force exerted by the punch 1 and rivet 9 (see FIGS. 2 and 3). The rod 204 is pushed sufficiently far downward that the slug of material (not shown) that is pushed from the workpiece is accommodated in the die 8 and a portion of the shank of the rivet is also accommodated in the die.

An opening from which a slug of workpiece material may be removed is not shown in FIG. 5, nor is a channel through which gas may be supplied. However, these may be provided in the die assembly 264 in the same way as shown in FIGS. 2 and 3. The slug of material is ejected from the die 8, for example using one of the mechanisms described further above.

Once the slug of material has been ejected from the die 8, the stepped adjustable end stop 240 may be used to move the rod 204 upwards such that it closes the die. This is achieved by moving the stepped adjustable end stop 240 such that the second surface 244 is located beneath the rod 204, as is shown in FIG. 6. Since the second surface 244 is higher than the first surface 242, the rod 204 is pushed further up the bore 202, closing the die 8. The position of the rod 204 is such that the upper surface 206 of the rod is co-planar (or substantially co-planar) with an upper surface 207 of the die body 200. The upper surface 206 of the rod 204 and the upper surface of the die body 200 provide an upsetting surface which may be used to upset the rivet via the application of force using the punch 1 (see FIGS. 2 and 3).

Although the stepped adjustable end stop 240 shown in FIGS. 5 and 6 is provided with two substantially flat surfaces 242, 244, the stepped adjustable end stop may be provided with three, four, five, six or more substantially flat surfaces. This may for example allow different shapes of upsetting surface to be formed using the upper surface 206 of the rod 204 and the upper surface 207 of the die body 200. For example, instead of selecting a configuration of the adjustable end stop 240 which provides co-planar upper surfaces 206, 207 of the rod and die body, a configuration of the adjustable end stop may be selected which causes the upper surface 206 of the rod to extend beyond the upper surface 207 of the die body. Alternatively, a configuration of the adjustable end stop may be selected which causes the upper surface 206 of the rod to be lower than the upper surface 207 of the die body.

Although the surfaces 242, 244 are described as being substantially flat, the surfaces may have some other form. The lowermost end 222 of the rod 204 may have a corresponding form (e.g. selected to provide a substantial contact area between the rod and the stepped adjustable end stop).

The helical spring 218 is used to separate the rod 204 from the stepped adjustable end stop 240 and provides the advantage that it allows the stepped adjustable end stop 240 to move freely. Although a helical spring 218 is shown, any suitable biasing means may be used to separate the rod 204 from the stepped adjustable end stop 240. It is not essential that a biasing means is provided. For example, the rod 204 may rest upon the stepped adjustable end stop 240, the adjustable end stop displacing the rod during movement of the adjustable end stop.

Figure 7:
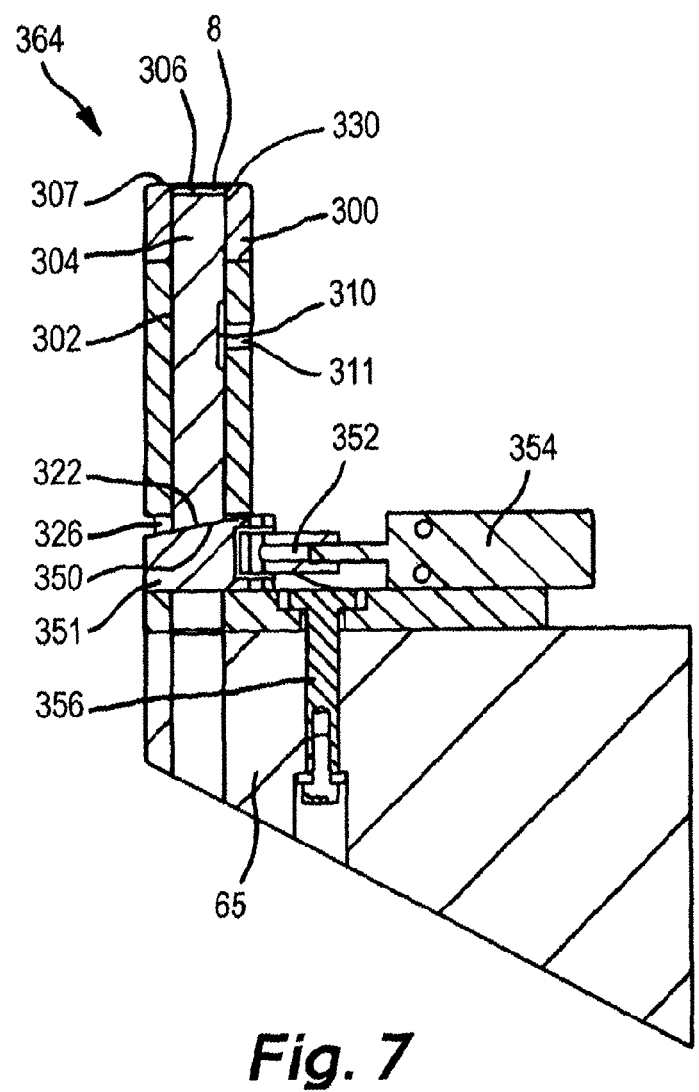
FIG. 7 is a cross-sectional view of part of a die assembly which may form part of an alternative embodiment of the invention.

FIG. 7 shows in cross-section a die assembly 364 which may form part of an alternative embodiment of the invention. FIG. 7 shows part of a die assembly 364 held on a lower jaw 65 of a C-frame. The die assembly 364 comprises a die body 300 which is connected to the lower jaw 65 of the C-frame by bolts 356. A generally cylindrical bore 302 is provided within the die body 300, and a rod 304 is located within the bore. The rod 304 is provided at an upper end with a substantially flat upper surface 306. An upper end of the bore 302 defines a die 8 into which a shank of a rivet may extend during fastening.

The rod 304 includes a reduced diameter portion 310 which may receive a plug (not shown) which passes through a threaded bore 311 in the die body 300 (the plug being used to retain the rod and/or limit movement of the rod if desired). Although this embodiment does not include a spring which biases the rod 304 upwards, a spring may be provided.

A lowermost end 322 of the rod 304 rests upon a sloped surface 350 of an adjustable end stop which comprises a sloped cam 351. The lowermost end 322 of the rod may be considered to be a cam follower. A biasing means (not shown) may be provided to bias the rod 304 against the sloped cam 351. The sloped cam 351 is located in an opening 326 in the die body 300 and is translatable in a direction which is substantially perpendicular to the direction of movement of the rod 304. The cam 351 is moved using an actuating rod 352 which is controlled by an actuator 354 (e.g. a pneumatic cylinder, piezo-electric actuator, stepper-motor or the like). Movement of the cam 351 by the actuator 354 may be controlled by a control apparatus (not shown). The opening 326 which receives the sloped cam 351 is sufficiently large to allow the sloped cam to be inserted into the opening with a range of positions which provide a desired range of positions of the rod 304.

The lowermost end 322 of the rod 304 is provided with a slope which substantially corresponds to the sloped surface 350 of the sloped cam 351. This allows substantially all of the lowermost end 322 of the rod 304 to be in contact with the sloped surface of the sloped cam 351. This is advantageous because it allows force applied to the rod 304 during fastening to be transmitted to the sloped cam 351 over a relatively large surface area (compared with the surface area if only a small portion of the lowermost end of the rod was in contact with the sloped cam).

In use, the height of an upper surface 306 of the rod 304 is controlled by the position of the sloped cam 351. The rod 304 may have an initial position, as determined by the sloped cam 351, which is sufficiently far down the bore 302 to allow a rivet to be inserted into a workpiece and to allow a slug of material to be accommodated in the die 8. An opening from which a slug of workpiece material may be removed is not shown in FIG. 7, nor is a channel through which gas may be supplied. However, these may be provided in the die assembly 364 in the same way as shown in FIGS. 2 and 3. The slug of material is ejected from the die 8, for example using one of the mechanisms described further above.

Once the slug of material has been ejected from the die 8, the sloped cam 351 is moved such that it pushes the rod 304 upwards and closes the die (or substantially closes the die). The position of the rod 304 is such that the upper surface 306 of the rod is co-planar (or substantially co-planar) with an upper surface 307 of the die body 100. The upper surface 306 of the rod 304 and the upper surface 307 of the die body 300 provide an upsetting surface which may be used to upset the rivet via the application of force using the punch 1 (see FIGS. 2 and 3).

Unlike the embodiments shown in FIGS. 4-6, the sloped cam 351 allows more than two positions of the rod 304 to be selected. The sloped cam 351 may allow variation in a continuous manner of the position of the rod 304. This may for example allow different shapes of upsetting surface to be formed using the upper surface 306 of the rod 304 and the upper surface 307 of the die body 300. For example, instead of selecting a position of the cam 351 which provides co-planar upper surfaces 306, 307 of the rod and die body, a cam 351 position may be selected which causes the upper surface 306 of the rod to extend beyond the upper surface 307 of the die body. Alternatively, a cam 351 position may be selected which causes the upper surface 306 of the rod to be lower than the upper surface 307 of the die body.

In the embodiments shown in FIGS. 4-6 the lowermost end 122, 222 of the rod 104, 204 rests upon a substantially flat surface when the rivet is being upset. Consequently, when force is applied by the punch 1 onto the rod 104, 204, this force is transmitted downwards through the adjustable end stop 124, 240 and does not include a component which tends to induce movement of the adjustable end stop. In contrast to this, in the embodiment shown in FIG. 7 a component of force exerted on the rod 304 during a fastening operation may act to push the sloping cam 351 towards the actuator 354. The surface 350 of the sloping cam 351 and/or the lowermost end 322 of the rod 304 may have a surface finish which generates friction between them (for example a rough surface finish), thereby inhibiting horizontal movement of the cam when downwards force is exerted on the rod. If the friction which is generated is sufficiently high, this may prevent horizontal movement of the sloping cam 351 during insertion of a rivet. The angle of the sloping surface 350 of the sloping cam 351 will determine what proportion of force exerted on the rod 304 tends to push the sloping cam 351 towards the actuator 354. The slope may be selected to be sufficiently shallow that the force exerted on the rod 304 by the punch 1 is not sufficient to cause movement of the sloping cam 351 (taking in to account the friction which is provided by the surface finish of the cam and/or the lowermost end 322 of the rod 304). Additionally or alternatively, the actuator 354 may be configured to withstand force exerted upon it by the punch.

In an alternative approach, the rod 304 may be used to upset a rivet by pushing upwards against the rivet instead of providing a surface against which a punch may push the rivet downwards (e.g. using the method shown in FIG. 3). Where this is done, the surface 350 of the sloping cam 351 (and the corresponding lowermost end 322 of the rod 304) may have a surface finish which does not generate friction between them. This may allow the actuator 354 to apply force to the rod 304 more easily than if a friction generating surface finish were used. The angle of the sloping surface 350 of the sloping cam 351 may be steeper. This may also allow the actuator 354 to apply force to the rod 304 more easily than if the angle of the sloping surface 350 were shallower.

Figure 8:
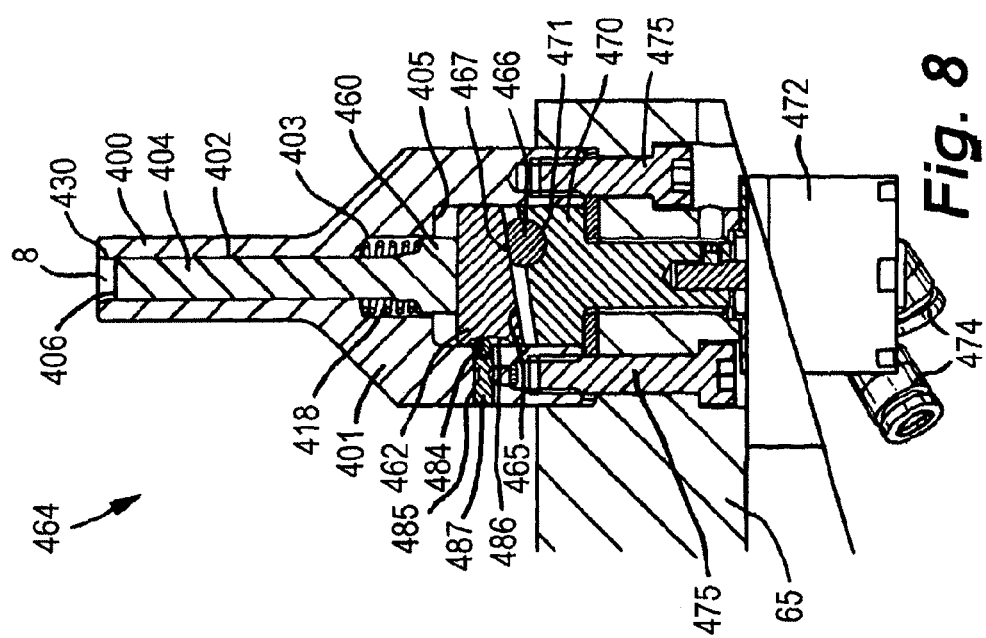
FIG. 8 is a cross-sectional view of a die assembly which may form part of an alternative embodiment of the invention in a first configuration.

FIG. 8 shows in cross-section a die assembly 464 which may form part of an alternative embodiment of the invention. Also shown in FIG. 8 is part of a lower jaw 65 of a C-frame (see FIG. 1) to which the die assembly is attached. The die assembly 464 comprises a die body 400 within which a generally cylindrical bore 402 is provided. A rod 404 is located within the bore 402. The rod 404 is provided at an upper end with a substantially flat upper surface 406. An upper end of the bore 402 defines a die 8 into which a shank of a rivet may extend during fastening.

The bore 402 includes a step 405 at a lower portion 403 which increases the diameter of the bore such that it may accommodate a helical spring 418. The rod 404 includes a lower portion with an increased diameter 460. The helical spring 418 abuts against the increased diameter portion 460 of the rod 404 and against the step 405 in the bore 402. The helical spring 418 is under compression and resiliently biases the rod 404 downwards and into the bore 402.

A cam follower 462 is provided at a lowermost end of the rod 404. The cam follower has a sloped surface 465 which is configured to cooperate with a ball 466 which forms part of an actuation apparatus. The ball 466 is provided with a flat surface 467 which is in contact with the sloped surface 465 of the cam follower 462. The actuation apparatus comprises a cam 470 which is connected to a rotary actuator 472, the ball 466 being held in a recess 471 provided in the cam. Rotation of the cam 470 by the actuator 472 may be controlled by a control apparatus (not shown). The cam 470 may be considered to be an adjustable end stop.

The rotary actuator 472 may for example be pneumatic, and may thus include connectors 474 configured to allow pneumatic pressure to pass to the rotary actuator and control its orientation. Alternatively, the rotary actuator 472 may be electric (for example the rotary actuator may be a stepper-motor).

The cam follower 462 and rod 404 are free to move in the axial direction (i.e. up and down), but are not free to rotate. Rotation of the cam follower 462 is prevented by a ball 484 which projects from a horizontal bore 485 in the die body 401 and which is received in a vertically oriented slot 486 in the cam follower 462. The ball 484 is held in place by a plug 487 provided in the horizontal bore 485. Thus, rotation of the cam 470 does not cause the cam follower 462 to rotate but instead forces the cam follower 462 to move up and down. The ball 466 is free to rotate in the recess 471 of the cam 470, thereby allowing the flat surface 467 of the ball to remain in contact with the sloped surface 465 of the cam follower 462. Allowing the flat surface 467 of the ball 466 to remain in contact with the sloped surface 465 of the cam follower 462 in this way is advantageous because the flat surface provides a surface area through which force may be transmitted during insertion of a rivet into a workpiece.

The die body 400 includes a flared lowermost portion 401, part of which is received in the lower jaw 65 of the C-frame. Bolts 475 are used to secure the die body 400 to the lower jaw 65.

In use, the cam 470 is rotated using the rotary actuator 472, whereupon the ball 466 either pushes the rod 404 upwards or allows the rod 404 to move downwards under bias of the helical spring 418 via the interaction of the flat surface 467 of the ball 466 with the sloped surface 465 of the cam follower 462. When the rotary actuator is in the configuration shown in FIG. 8, the flat surface 467 of the ball 466 is in contact with a thinnest portion of the sloped surface 465 of the cam follower 462. The rod 404 thus is withdrawn to a maximum extent into the bore 402. This provides a die 8 which is sufficiently deep to allow a slug of material to be accommodated in the die 8 and which is sufficiently deep to accommodate a lower end of a rivet shank.

A rivet is inserted into a workpiece and a slug of material is pushed from the workpiece into the die (as shown for example in FIGS. 2 and 3). An opening from which a slug of workpiece material may be removed is not shown in FIG. 8, nor is a channel through which gas may be supplied. However, these may be provided in the die assembly 464 in the same way as shown in FIGS. 2 and 3. The slug of material is ejected from the die 8, for example using one of the mechanisms described further above.

Figure 9:
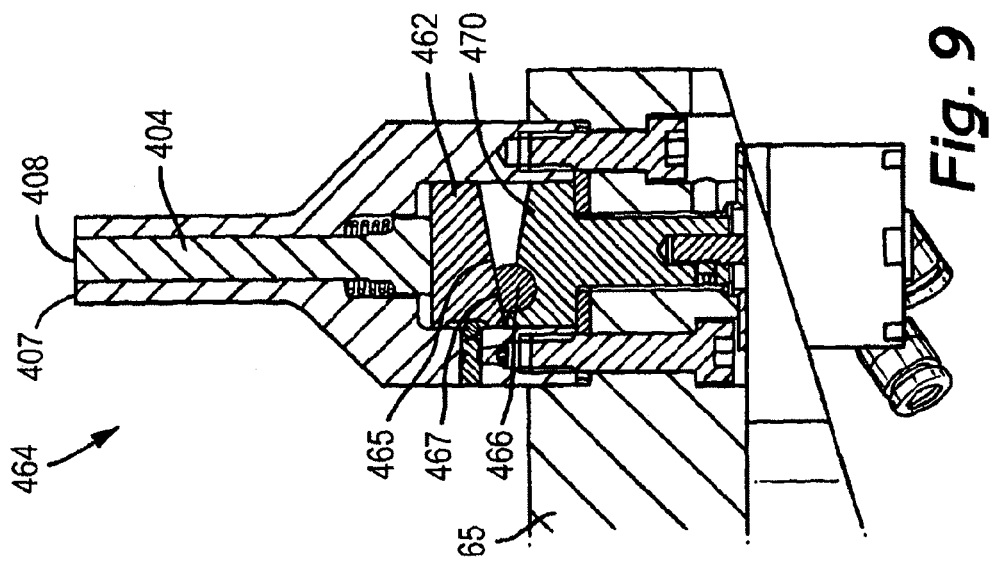
FIG. 9 is cross-sectional view of the die assembly of FIG. 8 in a second configuration.

Once the slug of material has been ejected from the die 8, the cam 470 is rotated, for example being rotated through 180° to the orientation shown in FIG. 9. This pushes the rod 404 upwards and closes the die 8 (or substantially closes the die). As may be seen from FIG. 9, the flat surface of the ball 467 is now in contact with the thickest portion of the sloped surface 465 of the cam follower 462. The ball 466 has thus pushed the cam follower 462 and the rod 404 upwards to a maximum extent, such that the upper surface 406 of the rod is co-planar (or substantially co-planar) with an upper surface 407 of the die body 400. The upper surface 406 of the rod 404 and the upper surface of the die body 400 provide an upsetting surface which may be used to upset the rivet via the application of force using the punch 1 (see FIGS. 2 and 3).

The rotary actuator 472 may move the cam 470 to orientations which are intermediate the orientations shown in FIGS. 8 and 9, thereby moving the rod 404 to different depths. The rotary actuator 472 and cam 470 may allow variation in a continuous manner of the position of the rod 404. This may for example allow different shapes of upsetting surface to be formed using the upper surface 406 of the rod 404 and the upper surface 407 of the die body 400. For example, instead of selecting an orientation of the cam 451 which provides co-planar upper surfaces 406, 407 of the rod and die body, a cam 451 orientation may be selected which causes the upper surface 406 of the rod to extend beyond the upper surface 407 of the die body. Alternatively, a cam 451 orientation may be selected which causes the upper surface 406 of the rod to be lower than the upper surface 407 of the die body.

The helical spring 418 ensures that the cam follower 462 remains in contact with the ball 466 when the cam 470 is rotating, thereby ensuring that the orientation of the ball changes such that the flat surface 467 of the ball remains pressed against the cam follower.

The actuator 472 may be capable of rotating the cam 470 through 360°.

The die assembly 464 may be used to provide rivet upsetting using the method shown in FIG. 2 or using the method shown in FIG. 3.

Figure 12:
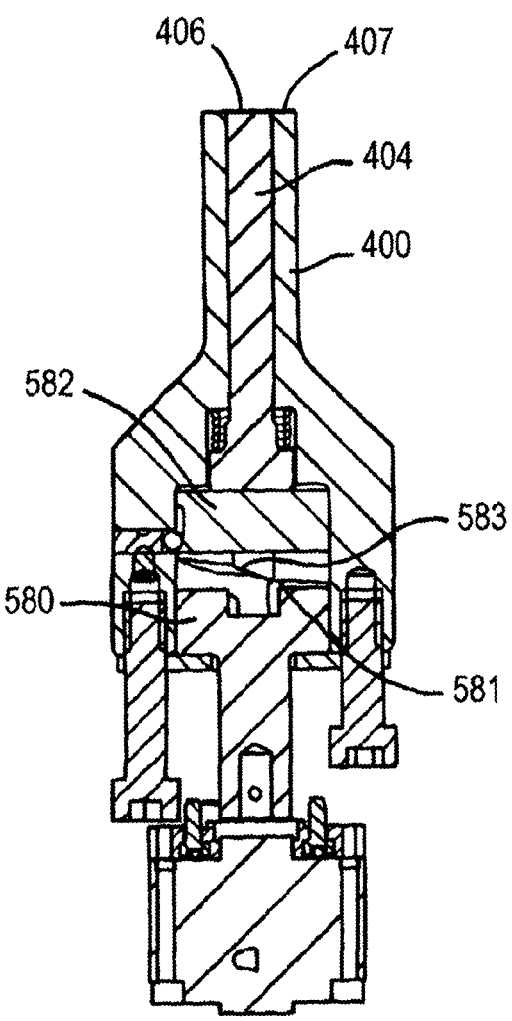
FIG. 12 is a cross-sectional view of the die of FIG. 10 in a second configuration.

A die assembly 564 according to a further alternative embodiment of the invention is shown in FIGS. 10-12. The die assembly corresponds generally with the die assembly 464 shown in FIGS. 8 and 9, and corresponding reference numerals are used for corresponding components. The die assembly 564 comprises a die body 400 within which a generally cylindrical bore 402 is provided. A rod 404 is located within the bore 402. The rod 404 is provided at an upper end with a substantially flat upper surface 406. An upper end of the bore 402 defines a die 8 into which a shank of a rivet may extend during fastening.

In this embodiment a cam 580 and a cam follower 582 are provided. The cam 580 may be considered to be an example of an adjustable end stop. No ball is provided between the cam 580 and the cam follower 582. Instead, the cam 580 and cam follower 582 are provided with surfaces 581, 583 which have corresponding shapes, the shapes comprising partial helixes. FIGS. 10 and 12 show the die assembly 564 in cross-section in a first configuration and a second configuration. FIG. 11 shows the cam 580 and cam follower 582 in an exploded perspective view (the cam and cam follower being in the first configuration). The orientation of the cam 580 may be controlled by a control apparatus (not shown) using an actuator 472.

As may be seen from FIG. 11, the surface 581 of the cam 580 comprises two partial helixes, each of which extends for just under 180°. The partial helixes are separated by a slot 584 which extends between them. The slot 584 may allow easier manufacturing of the cam surface 581 than would be the case if the slot were not present. The surface 583 of the cam follower 582 has a shape which corresponds with the shape of the surface 581 of the cam 580.

In common with the embodiments shown in FIGS. 8 and 9, the cam follower 582 is free to move in the axial direction but is not free to rotate. Rotation of the cam follower 582 is prevented by a ball 584 which projects from a horizontal bore 585 in the die body 401. A plug 587 holds the ball 584 in the horizontal bore 585. The ball 584 is received in a vertically oriented slot 586 in the cam follower 582 and prevents the cam follower from rotating.

In use, when the cam 580 has the orientation shown in FIG. 10, the surfaces 581, 583 of the cam and the cam follower 582 are fully in contact with one another, and the cam follower 582 is at a lowermost position such that the rod 404 is withdrawn into the bore 402 to a maximum extent. This provides a die 8 which is sufficiently deep to allow a slug of material to be accommodated in the die 8, and to allow a lower end of a rivet shank to be accommodated in the die.

A rivet is inserted into a workpiece and a slug of material is pushed from the workpiece into the die (as shown for example in FIGS. 2 and 3). An opening from which a slug of workpiece material may be removed is not shown in FIG. 10, nor is a channel through which gas may be supplied. However, these may be provided in the die assembly 564 in the same way as shown in FIGS. 2 and 3. The slug of material is ejected from the die 8, for example using one of the mechanisms described further above.

Once the slug of material has been ejected from the die 8, the cam 580 is rotated, for example to the orientation shown in FIG. 12. As a result of the rotation of the cam 580, the cam follower 582 and the rod 404 are pushed upwards. This pushes the rod 404 upwards such that the upper surface 406 of the rod is co-planar (or substantially co-planar) with an upper surface 407 of the die body 400. The upper surface 406 of the rod 404 and the upper surface 407 of the die body 400 provide an upsetting surface which may be used to upset the rivet via the application of force using the punch 1 (see FIGS. 2 and 3).

The cam 580 may be moved to orientations which are intermediate the orientations shown in FIGS. 10 and 12, thereby forming upsetting dies having other volumes. The cam 580 may thus allow variation in a continuous manner of the position of the rod 404. This may for example allow different shapes of upsetting surface to be formed using the upper surface 406 of the rod 404 and the upper surface 407 of the die body 400. For example, instead of selecting a position of the cam 580 which provides co-planar upper surfaces 406, 407 of the rod and die body, a cam 580 position may be selected which causes the upper surface 406 of the rod to extend beyond the upper surface 407 of the die body. Alternatively, a cam 580 position may be selected which causes the upper surface 406 of the rod to be lower than the upper surface 407 of the die body.

The embodiment shown in FIGS. 10-12 includes a helical spring 418 which is under compression and keeps the surfaces 581, 583 pressed against each other. The helical spring is not necessary and the helical spring may be omitted, although this may allow the cam follower to move in an uncontrolled manner within the die body 401 (for example during movement of the fastening apparatus between fastening locations).

The surfaces of the cam and cam follower may have a shape which differs from the shape shown in FIGS. 10-12. The surfaces may be rotationally symmetric for a rotation of around 180° about an axis which passes through the rod (e.g. two surfaces being provided on the cam). This will provide the advantage that force being exerted on the rod 404 by the punch 1 is transmitted through cam surfaces on either side of the axis. The surfaces may be rotationally symmetric for a rotation of around 120° (or some other rotation) about an axis which passes through the rod (e.g. three or more surfaces being provided on the cam). This will provide the advantage that force being exerted on the rod 404 by the punch is transmitted through cam surfaces which are distributed around the axis.

The die assembly 564 may be used to provide rivet upsetting using the method shown in FIG. 2 or using the method shown in FIG. 3.

Figure 13:
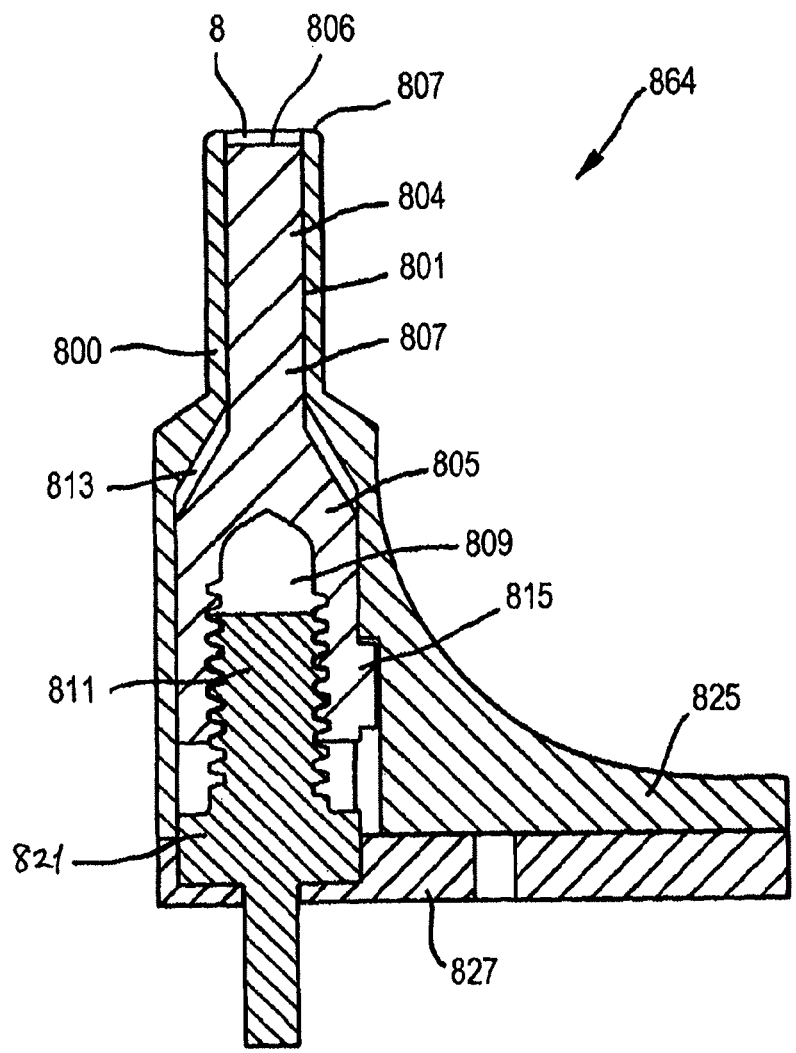
FIG. 13 is a cross-sectional view of a die assembly which may form part of an alternative embodiment of the invention.

A further alternative embodiment of the invention is shown in cross-section in FIG. 13. FIG. 13 shows part of a die assembly 864 which may be held on a lower jaw of a C-frame (not shown). A rod 804 is held within a bore 801 within a die body 800. The rod 804 is provided at an upper end with a substantially flat upper surface 806. An upper end of the bore 801 defines a die 8 into which a shank of a rivet may extend during fastening.

An outwardly tapering portion 805 is located at the bottom of an upper portion 807 of the rod 804, the rod 804 having an increased diameter beneath the outwardly tapering portion. A bore 809 which begins at a bottom end of the rod 804 extends into the rod. The bore 809 is threaded and receives a correspondingly threaded bolt 811.

The bore 801 in the die body 800 includes a tapering portion 813, the tapering portion generally corresponding with the tapering portion 805 of the rod 804. The bore tapering portion 813 acts to prevent the rod 804 from moving upwards within the bore 801 beyond a position at which the rod tapering portion 805 comes into contact with the bore tapering portion.

The bore 813 is not threaded, and is configured to allow the rod 804 to freely move axially within the bore (until the shoulder 805 comes into contact with the step 813). The rod 804 includes a protrusion 815 which is received in a correspondingly shaped recess of the bore 801. The protrusion 815 is provided on only one side of the rod 804 and the recess is similarly only provided on one side of the bore 801. As a result, the protrusion 815 prevents the rod 804 from rotating within the bore 801. In general, at least part of the rod and the bore may have any non-circular cross-sectional shape, thereby preventing the rod from rotating within the bore.

The die body 800 is formed in two parts, an upper part 825 and a lower part 827. A lower end of the bolt 811 extends through a the lower part 827 of the die body 800. A rotating actuator (not shown) may be connected to the lower end of the bolt and used to rotate the bolt. The rotating actuator may be controlled by a control apparatus (not shown).

The bolt 811 is provided with an intermediate portion 821 with an increased diameter. The die body 800 may include a corresponding portion with a corresponding diameter (although this is not shown). The intermediate portion 821 of the bolt 811 and the corresponding portion of the die body 800 act to retain the bolt within the die body and to substantially prevent axial movement of the bolt within the die body. Although axial movement of the bolt within the die body is substantially prevented, the bolt is free to rotate within the die body when it is driven to rotate by the rotating actuator.

In use, the height of the upper surface 806 of the rod 804 is controlled by the bolt 811, which is in turn controlled by the rotating actuator. Due to the threaded connection between the bolt 811 and the bore 809 of the rod 804, and because the protrusion 815 prevents the rod from rotating, rotation of the bolt will force the rod 806 to move axially within the die body 800. Thus, rotation of the bolt 811 in a first direction (e.g. clockwise) will cause the rod 804 to move upwards, thereby raising the upper surface 806 of the rod. Rotation of the bolt 811 in the opposite direction will cause the rod 804 to move downwards in the die body, thereby lowering the upper surface 806 of the rod.

The rod 804 may have an initial position, as determined by the bolt 811 and rotating actuator 819, which is sufficiently far down the bore 801 to allow a rivet to be inserted into a workpiece and to allow a slug of material to be accommodated in the die 8. An opening from which a slug of workpiece material may be removed is not shown in FIG. 13, nor is a channel through which gas may be supplied. However, these may be provided in the die assembly 864 in the same way as shown in FIGS. 2 and 3. The slug of material is ejected from the die 8, for example using one of the mechanisms described further above.

Once the slug of material has been ejected from the die 8, the bolt 811 is rotated such that it moves the rod 804 upwards and closes the die (or substantially closes the die). The position of the rod 804 is such that the upper surface 806 of the rod is co-planar (or substantially co-planar) with an upper surface 807 of the die body 800. The upper surface 806 of the rod 804 and the upper surface 807 of the die body 800 provide an upsetting surface which may be used to upset the rivet via the application of force using the punch 1 (see FIGS. 2 and 3).

In common with the embodiments shown in FIGS. 7-12, controlling movement of the rod 804 using the bolt 811 allows may different positions of the rod 804 to be selected. This may provide advantages which have been described further above in connection with the embodiments shown in FIGS. 7-12.

The thread provided on the rod 804 and bolt 811 may be sufficiently shallow that force exerted on the rod by the punch 1 (see FIGS. 2 and 3) does not cause significant axial movement of the rod.

The bolt 811 may be considered to be a threaded actuator, since rotation of the bolt causes axial movement of the rod 804 via engagement between the thread of the bolt and the threaded bore of the rod.

The die assembly 864 may be used to provide rivet upsetting using the method shown in FIG. 2 or using the method shown in FIG. 3.

In a further alternative embodiment of the invention (not illustrated) the rod which forms part of the die may be threaded and the bore in which the rod is held may be correspondingly threaded. In this embodiment the rod may be moved axially within the bore by driving the rod to rotate using a rotating actuator. This may allow the rod to be moved from a position which allows a slug of material and a lower end of a rivet shank to be accommodated to a position in which an upper surface of the rod is co-planar (or substantially co-planar) with an upper surface of the die body. Alternatively, it may be used to provide rivet upsetting using the method shown in FIG. 3.

In a further alternative embodiment of the invention (not illustrated) an adjustable end stop may comprise a threaded shaft that is held in a threaded die body. The adjustable end stop may be moved axially within the die body by driving the adjustable end stop to rotate using a rotating actuator. The axial movement of the adjustable end stop may cause axial movement of a rod which defines the bottom of a die, thereby changing the depth of the die. This may allow the rod to be moved from a position which allows a slug of material and a lower end of a rivet shank to be accommodated to a position in which an upper surface of the rod is co-planar (or substantially co-planar) with an upper surface of the die body. Alternatively, it may be used to provide rivet upsetting using the method shown in FIG. 3.

FIGS. 14 and 15 show a die assembly in which the rod is fixed and the die body may be moved over the rod. Referring to FIG. 14a, a die assembly 664 comprises a rod 604 provided within a bore 602 in a die body 600. The rod 604 extends beyond a lowermost end of the die body 600 and is held in a support structure 690. The support structure 690 may be held in a lower jaw of a C-frame (not shown). The rod 604 is received in a bore 691 formed in the support structure 690. A threaded bore 632 is provided on one side of the support structure 690, and a threaded plug 634 is held in the threaded bore. The threaded plug 634 extends into a reduced diameter section 692 of the rod 604. The threaded plug 634 thus holds the rod in the support structure 690 and prevents it from falling out of the support structure. The diameter of the rod 604 reduces at a step 616. A helical spring 618 abuts against the step 616. An opposite end of the helical spring 618 abuts against a step 620 at which the diameter of the bore 602 reduces.

The support structure 690 is provided with an opening 693, and a cam 640 is provided in the opening. The cam 640 may be considered to be an example of an adjustable end stop. The cam 640 is forked and is provided with arms 694 which extend either side of the rod 604. Although only one of the forks 694 is shown in FIG. 14a, both of the forks 694 may be seen in FIG. 14b. Each of the forks 694 comprises a first substantially planar surface 695 and a second substantially planar surface 696. The first surface 695 is lower than the second surface 696. The arms 694 extend from a block 646 which is connected to an actuator (not shown). The position of the cam 640 may be controlled by a control apparatus (not shown).

The die body 600 is vertically moveable relative to the rod 604 and the support structure 690. A lowermost surface of the die body 600 is in contact with the cam 640. The helical spring 618 resiliently biases the die body 600 downwards, thereby pushing the die body against the cam 640.

In use, as shown in FIG. 14a and FIG. 14b, the cam 640 may have a position in which the second surface 696 of the arms 694 is located beneath the die body 600. The height of the die body 600 is thus determined by the height of the second surface 696 of the cam 640. The die body 600 and the rod 604 form a die 8 which is sufficiently deep to allow a slug of material to be accommodated in the die 8 and which is sufficiently deep to accommodate a lower end of a rivet shank.

A rivet is inserted into a workpiece and a slug of material is pushed from the workpiece into the die 8 (as shown for example in FIGS. 2 and 3). An opening from which the slug of workpiece material may be removed is not shown in FIG. 14, nor is a channel through which gas may be supplied. However, these may be provided in the die assembly 664 in the same way as shown in FIGS. 2 and 3. The slug of material is ejected from the die 8, for example using one of the mechanisms described further above.

Once the slug of material has been ejected from the die 8, the cam 640 is moved such that the die body 600 moves downwards and the rod 604 thus closes the die (or substantially closes the die). This is achieved by moving the cam 640 such that the second surface 695 of the arms 694 is located beneath the die body 600 (as shown in FIG. 15). Since the second surface 694 is lower than the first surface 696, the die body 600 is moved downwards relative to the rod 604 thereby closing the die 8. The position of the die body 600 is such that the upper surface 607 of the die body is co-planar (or substantially co-planar) with an upper surface 606 of the rod 604. The upper surface 607 of the die body 600 and the upper surface 606 of the rod 604 provide an upsetting surface which may be used to upset the rivet via the application of force using the punch 1 (see FIGS. 2 and 3).

A step 643 between the first surface 695 and the second surface 696 of the arms 694 is sloped. The slope of the step 643 may for example correspond with a sloped edge provided at a lowermost end of the die body 600. The sloped surface of the step 643 and the sloped surface of the die body may allow the cam 640 to push the die body 600 upwards when the cam moves from the configuration shown in FIG. 15 to the configuration in FIGS. 14a and 14b.

Although the arms 694 of the cam 640 each have two surfaces 695, 696 upon which the die body 600 may rest, the arms may be provided with a different number of surfaces. For example, each arm may be provided with three, four, five, six or more surfaces. This may for example allow different shapes of upsetting surface to be formed using the upper surface 606 of the rod 604 and the upper surface 607 of the die body 600. For example, instead of selecting a configuration of the adjustable end stop 640 which provides co-planar upper surfaces 606, 607 of the rod and die body, a configuration of the adjustable end stop may be selected which causes the upper surface 606 of the rod to extend beyond the upper surface 607 of the die body. Alternatively, a configuration of the adjustable end stop may be selected which causes the upper surface 606 of the rod to be lower than the upper surface 607 of the die body.

Although the surfaces 695, 696 are shown as being substantially flat, the surfaces may have some other form. The lowermost end of the die body 600 may have a corresponding form (e.g. selected to provide a substantial contact area between the die body and the surfaces).

Although a helical spring 618 is shown, any suitable biasing means may be used. It is not essential that a biasing means is provided.

When the die assembly 664 of FIGS. 14 and 15 is used to provide the method shown in FIG. 3, some downward movement of the punch 1 and nose 15 may be used together with movement of the C-frame 63 to narrow the separation between the die body 600 and the punch and nose before or during upsetting of the rivet.

Figure 16:
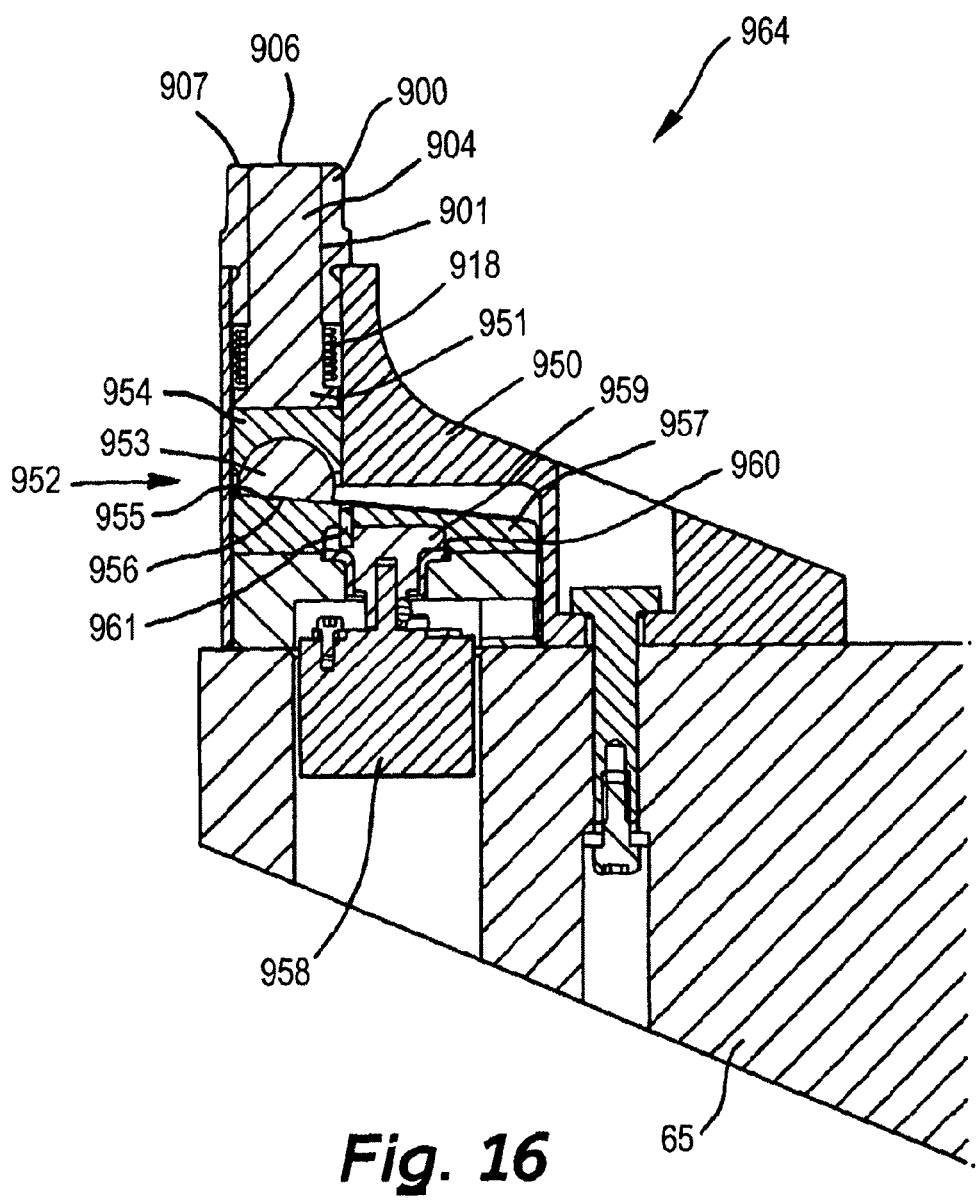
FIG. 16 is a cross-sectional view of a die assembly which may form part of an alternative embodiment of the invention.

A further alternative embodiment of the invention is shown in cross-section in FIG. 16. FIG. 16 shows part of a die assembly 964 which may be held on a lower jaw 65 of a C-frame. A rod 904 is held within a bore 901 within a die body 900. The rod 904 is provided at an upper end with a substantially flat upper surface 906. An upper end of the bore 901 defines a die into which a shank of a rivet may extend during fastening (the die is not visible in FIG. 16 because it has been fully closed by the rod 904).

The die body 900 is secured to a support 950 which is in turn secured to the lower jaw 65 of the C-frame. The rod 904 is free to move axially within the housing 900. A lower portion of the rod 904 projects out of a bottom end of the bore 901. A flange 951 is provided at a lowermost end of the rod 904. A spring 918 extends between the flange 951 and a lowermost end of the housing 900, the spring being configured to resiliently bias the flange 951 (and hence the rod) away from the lowermost end of the housing.

A cam follower 952 is provided at a lowermost end of the rod 904. The cam follower comprises a ball 953 which is received in a recess in a holder 954. The ball 953 has a sloped surface 955 which is configured to cooperate with a sloped cam surface 956 of a cam 957. The cam 957 is configured to rotate about an axis of rotation. The cam 957 may be considered to be an adjustable end stop. Although the cam follower comprises a ball 953 in a recess in this embodiment, any suitable cam follower may be used.

The cam 957 is driven to rotate by an electric motor 958 (or other suitable actuator) which his connected to the lower jaw 65 of the C-frame. A cap 959 is attached to the electric motor 958 such that the cap is rotated by the electric motor. The cap 959 is received in an opening 960 in the cam 957, a pin 961 being used to secure the cap to the cam. The cam 957 is thereby securely attached to the cap 959 such that the cam is forced to rotate with the cap. The cam 957 thus rotates when the electric motor 958 rotates.

The electric motor 958 includes an encoder which monitors the orientation of the electric motor, and hence monitors the orientation of the cam 957. The encoder is connected to control apparatus (not shown) of the fastener apparatus, and provides feedback regarding the orientation of the electric motor 958 (thereby providing feedback regarding the orientation of the cam 957). This allows the control apparatus to accurately control the orientation of the cam 957.

In use, the height of the upper surface of the rod 904 is controlled by rotating the cam 957 using the electric motor 958. Because the cam surface 956 of the cam 957 is sloped, rotation of the cam in a first direction will cause the ball 953 and rod 904 to move downwards under the resilient bias of the spring 918, and rotation of the cam in an opposite direction will cause the ball and rod to move upwards against the resilient bias of the spring. Thus, the height of the upper surface of the rod 904 may be controlled using the electric motor.

The rod 904 may have an initial position, as determined by the cam 957 and electric motor 958, which is sufficiently far down the bore 901 to allow a rivet to be inserted into a workpiece and to allow a slug of material to be accommodated in the die 8. An opening from which a slug of workpiece material may be removed is not shown in FIG. 16, nor is a channel through which gas may be supplied. However, these may be provided in the die assembly 864 in the same way as shown in FIGS. 2 and 3. The slug of material is ejected from the die 8, for example using one of the mechanisms described further above.

Once the slug of material has been ejected from the die 8, the cam 957 is rotated such that it moves the rod 904 upwards and closes the die (or substantially closes the die). The position of the rod 904 is such that the upper surface 906 of the rod is co-planar (or substantially co-planar) with an upper surface 907 of the die body 900 (i.e. as shown in FIG. 16). The upper surface 906 of the rod 904 and the upper surface 907 of the die body 900 provide an upsetting surface which may be used to upset the rivet via the application of force using the punch 1 (see FIGS. 2 and 3).

In common with the embodiments shown in FIGS. 7-12, controlling movement of the rod 904 using the cam 957 allows may different positions of the rod 904 to be selected. This may provide advantages which have been described further above in connection with the embodiments shown in FIGS. 7-12.

Figure 17A:
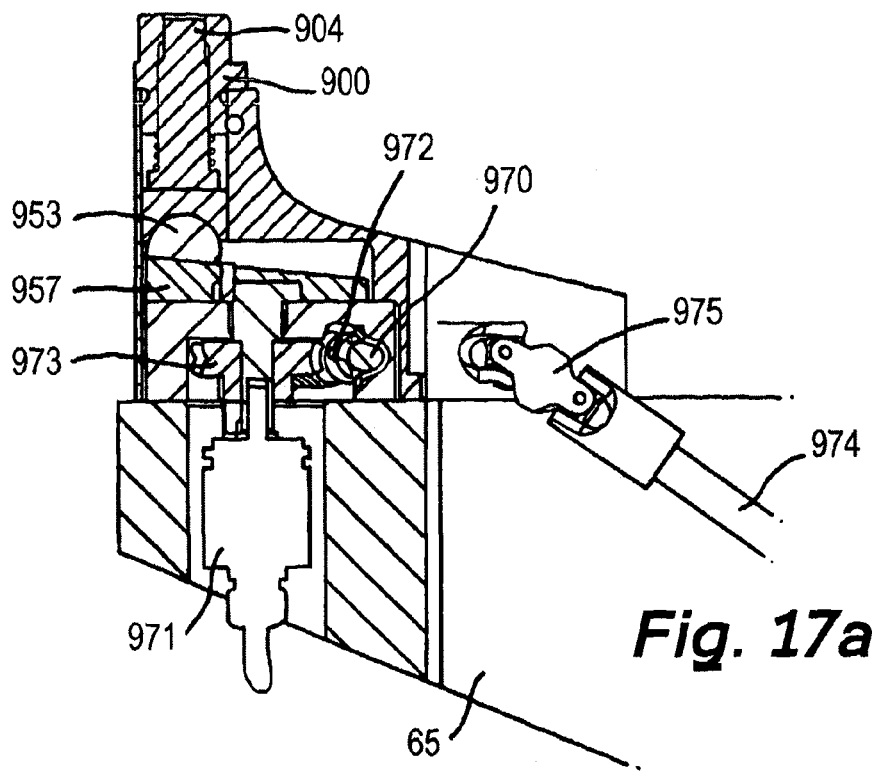
FIG. 17 is a cross-sectional view of a die assembly which may form part of an alternative embodiment of the invention.
Figure 17B:
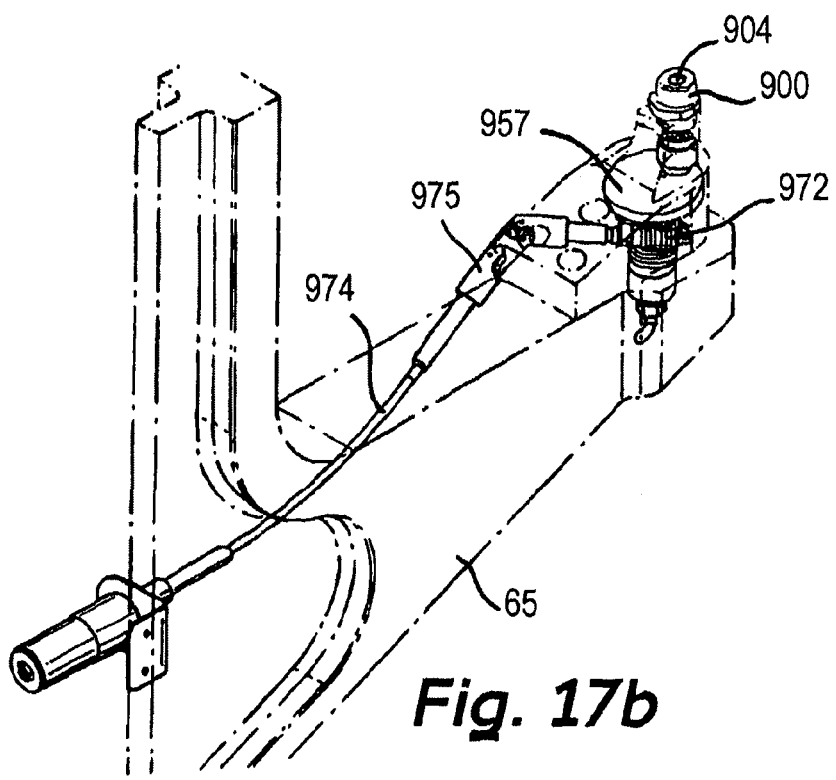

A further alternative embodiment of the invention is shown in FIG. 17, the embodiment being shown in cross-section in FIG. 17a and in perspective view in FIG. 17b. Many features of the embodiment shown in FIG. 17 correspond with the embodiment shown in FIG. 16, and these features are therefore not described again in connection with FIG. 17. Because limited space is available, not all of the features are labelled in FIG. 17. Unlike the embodiment shown in FIG. 17 an actuator 970 and encoder 971 are provided as separate entities. The encoder 971 is located beneath the cam 957 and provides feedback regarding the orientation of the cam via an axial connection to the cam. The actuator comprises a grub screw 972 which engages with a cog 973 connected to the cam 957, such that the cog (and hence the cam) rotates when the grub screw rotates. The grub screw 972 is driven to rotate by a motor (not shown), a flexible drive 974 extending from the motor to the grub screw. The flexible drive 974 may for example include a universal joint 975.

Operation of the embodiment shown in FIG. 17 is the same as operation of the embodiment shown in FIG. 16, except that actuation of the cam 957 and monitoring of the orientation of the cam are provided separately.

In embodiments of the invention, selection of the position of the rod 4, 104, 204, 304, 404, 804, 904 or the position of the die body 600 may be controlled by a control apparatus. The selection of the position of the rod may be via an operator of the fastening apparatus inputting values into the control apparatus. Alternatively, the selection of the position of the rod may be automated by the control apparatus (e.g. based on previously input parameters). The control apparatus may for example be a microprocessor, and may for example comprise a programmable logic controller. The control apparatus may for example be part of a more complex control apparatus, for example a control apparatus which controls movement of a robot upon which the fastening apparatus is provided, and/or controls delivery of rivets to the fastening apparatus, and/or controls a production line.

Embodiments of the invention may be configured to provide a die 8 which is sufficiently deep to accommodate a slug 16 of material pushed from a workpiece 5 and the lower end of a shank of a rivet 9 (see FIGS. 2 and 3). The depth of the die may for example be 24 mm or greater, or may for example be 16 mm or greater (e.g. to accommodate a slug of material 12 mm thick and 4 mm of a rivet shank). Embodiments of the invention may be configured to move the rod 4, 104, 204, 304, 404, 804, 904 or die body 600 to close or substantially close the die 8.

Although the actuators shown in the embodiments illustrated in FIGS. 7-12, 14-16 are located adjacent to the cams which they are actuating, the actuators may be located away from the cams. Similarly, actuators used by the embodiments illustrated in FIGS. 2-6, 13 may be located adjacent to the adjustable end stops or away from the adjustable end stops. Locating an actuator away from an adjustable end stop may be advantageous. For example, the actuator may be located away from parts of the C-frame 63 which are close to a workpiece during fastening of the workpiece, thereby avoiding the possibility that the actuator acts as an obstruction.

The actuators which are used to actuate the adjustable end stops that are used to close the die 8 may for example be electrical, mechanical, hydraulic or pneumatic (e.g. a pneumatic cylinder, piezo-electric actuator, stepper-motor or the like). They may be controlled by the control apparatus. The actuators may have open or closed loop feedback control, which may allow accurate opening and closing of the die. Feedback (e.g. positional information) from the actuators or from the rod 4, 104, 204, 304, 404, 804, 904 or die body 600 may pass to the control apparatus, which may take the feedback into account when controlling the actuators. The feedback may for example be provided by sensors and/or other detectors.

Computer programs may be provided to instruct the riveting apparatus to carry out the methods described herein. Such computer programs may be carried on appropriate computer readable media, which term includes appropriate tangible storage devices (e.g. discs).

Embodiments of the invention have been described in the context of conventional rivets (sometimes referred to as solid rivets). However, the invention may also be used with other types of rivet. For example the invention may be used with weld studs, mechanical studs or slugs (sometimes referred to as headless rivets). The invention may be used with solid nut rivets (rivets which comprise a threaded nut that is inserted through a workpiece and is then upset to secure the threaded nut in the workpiece).

Various terms such as vertical, horizontal, lower and higher may be used in the description of embodiments of the invention. These terms are used merely to facilitate description of the embodiments and are not intended to imply that the faster apparatus or any components of the fastening apparatus must have a particular orientation.

The term "workpiece" may include any combination of materials and material types, including adhesive, that are to be fastened whether part of the same structure or separate structures.

The illustrated embodiments of the invention may be used to provide upsetting of a self piercing rivet via the die 8. The height of the die 8 may be adjusted by moving the rod 4, 104, 204, 304, 404, 804, 904 or die body 600. This may allow upsetting of self piercing rivets with different dimensions to be achieved. Thus, the invention provides for upsetting of solid rivets and upsetting of self-piercing rivets.

In described embodiments of the invention the upper surface 106, 206, 306, 406, 606, 806, 906 of the rod is flat. However, the upper surface of the rod may have any suitable shape. The upper surface of the rod may for example include a pip. In described embodiments of the invention the upper surface 107, 207, 307, 407, 607, 807, 907 of the die body is flat. However, the upper surface of the die body may have any suitable shape. The upper surface of the die body may for example have a sloped profile or some other shaped profile.

The term "rod" is not intended to imply a particular length or a particular construction. For example, the rod may have any length which is sufficient to allow rivet insertion into a workpiece and ejection of a slug of material into the die, and to subsequently close or substantially close the die (either using the rod alone or using the rod in combination with the slug of material). The rod may be a single piece of material, or may be formed from a plurality of pieces of material which are connected together.

Although the carrier on which the riveting apparatus 61 is provided is a C-frame 63, the riveting apparatus may be provided on any suitable frame.

Operation of the riveting apparatus is described in connection with FIGS. 2 and 3 as a sequential series of movements or motions of parts of the apparatus. However, it is not necessary that the apparatus be operated with the described particular sequential series of movements or motions. The movements or motions may for example be non-sequential (i.e. overlap in time with one another). For example, in the method shown in FIG. 2 downward movement of the punch 1 may be initiated before upward movement of the rod 4 has finished (or equivalently before downward movement of the die body 3 has finished). Using one or more overlapping movements or motions may allow riveting to be performed more quickly. In general, any suitable combination or sequence of motion or movement of the die body, rod, punch, nose and C-frame may be used to insert a rivet through a workpiece and upset the rivet.

The control apparatus may form part of the control system 71 of the fastener system (see FIG. 1) or may be a separate apparatus 73.

Features of embodiments of the invention may be used in combination with features of other embodiments of the invention.

The invention claimed is:

1. A method of riveting comprising:
    using a punch to push a rivet through a workpiece such that a shank of the rivet is received in a die defined by a die body which is in contact with the workpiece, a slug of material being removed from the workpiece by the rivet and being received in the die,
    closing or substantially closing the die using a rod and using the rod to upset the shank of the rivet, or closing or substantially closing the die using a rod and the slug of material and using the rod and the slug of material to upset the shank of the rivet,
    wherein the perimeter of the slug is determined by the perimeter of the die, and
    wherein the diameter of the die is sufficiently greater than the diameter of the rivet shank to allow a flattened portion of the rivet shank to be accommodated in the die during upsetting of the rivet.

2. The method of claim 1, wherein the method further comprises removing the slug of material from the die before the shank of the rivet is upset, and using an upper surface of the rod to upset the shank of the rivet.

3. The method of claim 2, wherein an upper surface of the die body is used in combination with the upper surface of the rod to upset the shank of the rivet.

4. The method of claim 1, wherein an upper surface of the slug of material is used to upset the shank of the rivet.

5. The method of claim 1, wherein the die is closed or substantially closed by moving the rod within the die body.

6. The method of claim 5, wherein the rod includes a threaded portion, and wherein rotation of the rod or rotation of a correspondingly threaded actuator is used to move the rod.

7. The method of claim 5, wherein the position of the rod within the die body is determined by an adjustable end stop.

8. The method of claim 7, wherein the adjustable end stop has a plurality of surfaces, and is moveable between a first configuration in which the rod is in contact with a first adjustable end stop surface and is withdrawn within the die body to form the die, and a second configuration in which the rod is in contact with a second adjustable end stop surface and the rod closes or substantially closes the die.

9. The method of claim 7, wherein the adjustable end stop comprises a cam which is moveable between a plurality of configurations in which the rod is in contact with the cam, the cam moving the rod between a withdrawn rod position within the die body to form the die and a rod position which closes or substantially closes the die.

10. The method of claim 9, wherein the cam is a plate which is configured to rotate about an axis of rotation.

11. The method of claim 1, wherein the die is closed or substantially closed by moving the die body over the rod.

12. The method of claim 11, wherein the position of the die body is determined by an adjustable end stop.

13. The method of claim 1, wherein when the die is closed or substantially closed an upper surface of the rod is co-planar with or substantially co-planar with an upper surface of the die body.

14. The method of claim 1, wherein the relative position of the rod and the die body is determined by one or more actuators.

15. The method of claim 14, wherein the one or more actuators are controlled by a control apparatus.

16. The method of claim 1, wherein the slug of material is removed from the die through an opening in a side of the die body.

17. The method of claim 16, wherein a jet of gas or an arm is used to push or pull the slug of material through the opening in the side of the die body, or a vacuum or a magnet is used to draw the slug of material through the opening in the side of the die body.

18. The method of claim 1, further including manufacturing a product or a sub-assembly by riveting one or more workpieces.

19. A riveting apparatus, comprising:
    a punch and a die defined by a die body, the punch being configured to push a rivet through a workpiece such that a shank of the rivet is received in the die,
    wherein the apparatus further comprises a rod which is configured to close or substantially close the die and to upset the shank of the rivet, either in combination with a slug of material removed from the workpiece or without a slug of material removed from the workpiece,
    wherein the perimeter of the slug is determined by the perimeter of the die, and
    wherein the diameter of the die is sufficiently greater than the diameter of the rivet shank to allow a flattened portion of the rivet shank to be accommodated in the die during upsetting of the rivet.

20. The riveting apparatus of claim 19, wherein the apparatus is configured to close or substantially close the die such that an upper surface of the rod may be used to upset the shank of the rivet, or such that an upper surface of a slug of material removed from the workpiece by the rivet may be used to upset the shank of the rivet.

21. The riveting apparatus of claim 19, wherein an upper surface of the die body is configured such that it may combine with the upper surface of the rod to form a combined upsetting surface.

22. The riveting apparatus of claim 21, wherein the rod and die body are configured such that an upper surface of the rod may be made co-planar with or substantially co-planar with an upper surface of the die body.

23. The riveting apparatus of claim 19, wherein the rod is moveable within the die body to close or substantially close the die.

24. The riveting apparatus of claim 23, wherein the rod includes a threaded portion and is configured such that rotation of the rod or rotation of a correspondingly threaded actuator will move the rod.

25. The riveting apparatus of claim 23, wherein the apparatus further comprises an adjustable end stop which determines the position of the rod within the die body.

26. The riveting apparatus of claim 25, wherein the adjustable end stop has a plurality of surfaces, and is moveable between a first configuration in which the rod is in contact with a first adjustable end stop surface and is withdrawn within the die body to form the die, and a second configuration in which the rod is in contact with a second adjustable end stop surface and the rod closes or substantially closes the die.

27. The riveting apparatus of claim 25, wherein the adjustable end stop comprises a cam which is moveable between a plurality of configurations in which the rod is in contact with the cam, the cam moving the rod between a withdrawn rod position within the die body to form the die and a rod position which closes or substantially closes the die.

28. The riveting apparatus of claim 27, wherein the cam is a plate which is configured to rotate about an axis of rotation.

29. The riveting apparatus of claim 19, wherein the die body is moveable over the rod to close or substantially close the die.

30. The riveting apparatus of claim 29, wherein the apparatus further comprises an adjustable end stop which determines the position of the die body.

31. The riveting apparatus of claim 19, wherein the relative position of the rod and the die body is determined by one or more actuators.

32. The riveting apparatus of claim 31, wherein the one or more actuators are controlled by a control apparatus.

33. The riveting apparatus of claim 19, wherein the apparatus further comprises a mechanism configured to remove a slug of material from the die.

34. The riveting apparatus of claim 33, wherein the mechanism comprises an opening in a side of the die body, and further comprises a channel configured to deliver a jet of gas arranged to push or pull the slug of material through the opening, an arm configured to push the slug of material through the opening, or a vacuum source, magnet or other means configured to draw the slug of material through the opening.

35. The riveting apparatus of claim 19, further comprising a rivet feeding system and a control system.

36. The method of claim 1, wherein the die cooperates with the rivet to shear the slug of material from the workpiece.

37. The riveting apparatus of claim 19, wherein the die cooperates with the rivet to shear the slug of material from the workpiece.

* * * * *